US007925474B2

(12) United States Patent
Froyland et al.

(10) Patent No.: US 7,925,474 B2
(45) Date of Patent: Apr. 12, 2011

(54) SYSTEM AND METHODS(S) OF BLENDED MINE PLANNING, DESIGN AND PROCESSING

(75) Inventors: Gary Allan Froyland, Kensington (AU); Merab Menabde, Cheltenham (AU)

(73) Assignee: BHP Billiton Innovation Pty Ltd., Melbourne, Victoria (AU)

( * ) Notice: Subject to any disclaimer, the term of this patent is extended or adjusted under 35 U.S.C. 154(b) by 1409 days.

(21) Appl. No.: 10/530,846

(22) PCT Filed: Oct. 2, 2003

(86) PCT No.: PCT/AU03/01299

§ 371 (c)(1),
(2), (4) Date: Apr. 3, 2006

(87) PCT Pub. No.: WO2004/033854

PCT Pub. Date: Apr. 22, 2004

(65) Prior Publication Data

US 2006/0265342 A1 Nov. 23, 2006

(30) Foreign Application Priority Data

| | | |
|---|---|---|
| Oct. 9, 2002 | (AU) | 2002951892 |
| Oct. 9, 2002 | (AU) | 2002951895 |
| Oct. 9, 2002 | (AU) | 2002951898 |
| Oct. 9, 2002 | (AU) | 2002951957 |
| Nov. 14, 2002 | (AU) | 2002952654 |
| Nov. 14, 2002 | (AU) | 2002952681 |

(51) Int. Cl.
*G06F 17/50* (2006.01)

(52) U.S. Cl. ............................................. 703/1; 299/19

(58) Field of Classification Search ................. 703/1, 10
See application file for complete search history.

(56) References Cited

U.S. PATENT DOCUMENTS 3,692,364 A * 9/1972 Henriksson et al. ............ 299/18

OTHER PUBLICATIONS

Hochbaum et al, "Performance Analysis and Best Implementations of Old and New Algorithms for the Open-Pit Mining Problem", Department of Industrial Engineering and Operations Research, University of California at Berkley, Jan. 16, 1998.*

Gershon, Mark, "Heuristic Approaches for Mine Planning and Production Scheduling", International Journal of Mining and Geological Engineering, 1987, 5, pp. 1-13.*

Bezdek, James C. et al., "Convergence Theory for Fuzzy c-Means: Counterexamples and Repairs", *IEEE Transactions on Systems, Man, and Cybernetics*, vol. SMC-17, No. 5 pp. 873-877, Sep./Oct. 1987.

(Continued)

*Primary Examiner* — Mary C Jacob

(74) *Attorney, Agent, or Firm* — Brinks Hofer Gilson & Lione; G. Peter Nichols

(57) ABSTRACT

The present invention relates to the field of extracting resource(s) from a particular location. In particular, the present invention relates to the planning, design and processing related to a mine location in a manner based on enhancing the extraction of material considered of value, relative to the effort and/or time in extracting that material. The present application discloses, amongst other things, a method of and apparatus for determining the removal of material(s) from a location, determining the removal of material(s) of a differing relative value from a location, determining a schedule corresponding to a risk and/or return basis, determining aggregated block ordering for the extraction of material from a location, determining a schedule for extraction of dumps and determining a mine design.

15 Claims, 12 Drawing Sheets

OTHER PUBLICATIONS

Brealey, S.C. et al., "Opencast Mining", *The Mining Engineer, I.M.E. (UK)*, No. 99, pp. 147-163, Dec. 1968.

Caccetta, Louis et al., "An Application of Branch and Cut to Open Pit Mine Scheduling", http://ructor.rutgers.edu/~do99/EA/SHill.doc, pp. 1-24, 1999.

International Search Report for PCT/AU03/01298, dated Nov. 7, 2003.

International Search Report for PCTAU03/01299, dated Nov. 11, 2003.

Kaas, L. Michael, "Computer Techniques for Production Scheduling and Blending of Taconite" *Proceedings of the 26th Annual Mining Symposium*, University of Minnesota, pp. 135-144, Jan. 1965.

Lerchs, Helmut et al., Optimum Design of Open-Pit Mines, *Transactions, C.I.M.*, vol. LXVII, pp. 17-24, 1965.

Pana, M.T., "The Simulation Approach to Open-Pit Design", *Transactions of the Short Course and Symposium on Computers and Computer Applications in Mining and Exploration*, University of Arizona, pp. 1-24, Mar. 1965.

Underwood, R. et al., "A Mathematical Programming Viewpoint for Solving the Ultimate Pit Problem", *EJOR*, vol. 107 pp. 96-107, 1998.

Wharton, Christopher et al., "The Effect of Mining Width on NPV", *Proceedings of the 1997 Whittle Conference "Optimizing with Whittle"*, Perth, Western Australia, pp. 174-178, Apr. 1997.

* cited by examiner

Figure 3
prior art
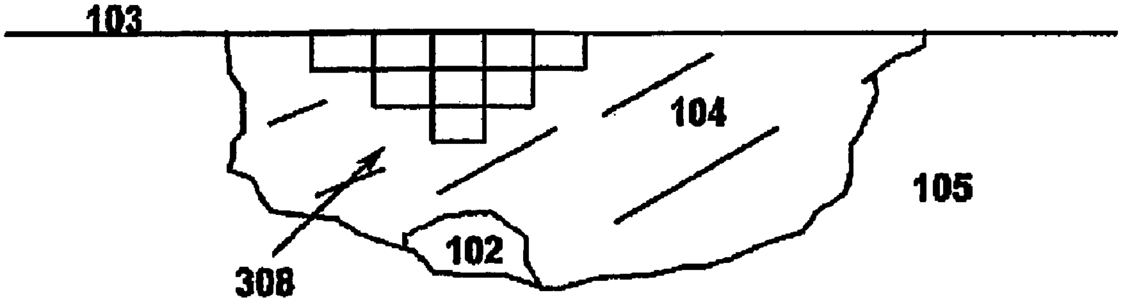
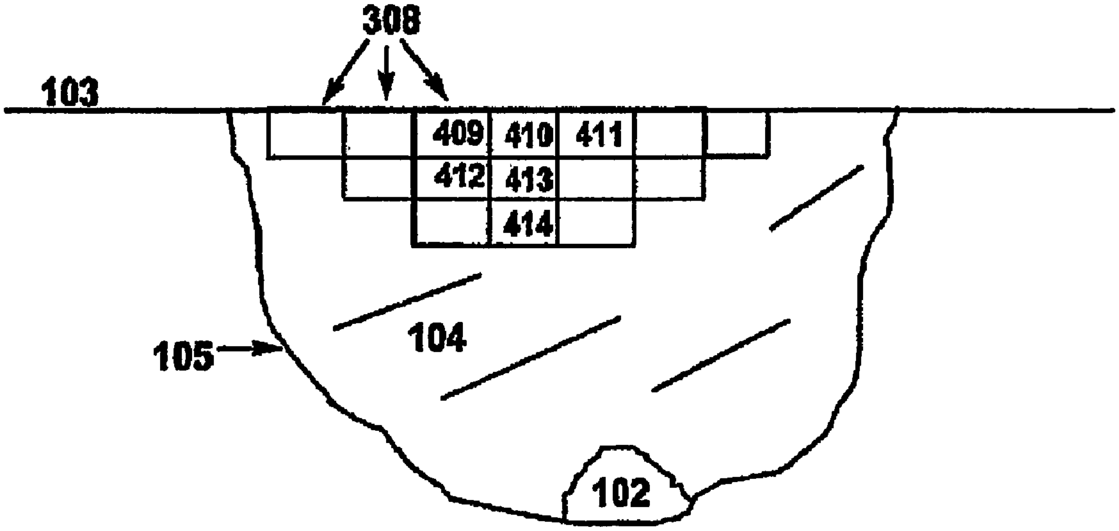
Figure 4
prior art find-extract-order-optimal

Figure 13 KlumpKing Top-Level Flow Chart

Plan view : 2D block slice

SYSTEM AND METHODS(S) OF BLENDED MINE PLANNING, DESIGN AND PROCESSING

FIELD OF INVENTION

The present invention relates to the field of extracting resource(s) from a particular location. In particular, the present invention relates to the planning, design and processes related to a mine location in a manner based on enhancing the extraction of material considered of value, relative to the effort and/or time in extracting that material. In one form, the present invention relates to mining, mine planning and design which enhances blending of material and/or resource(s) extracted.

BACKGROUND ART

In the mining industry, once material of value, such as ore situated below the surface of the ground, has been discovered, there exists a need to extract that material from the ground.

In the past, one more traditional method has been to use a relatively large open cut mining technique, whereby a great volume of waste material is removed from the mine site in order for the miners to reach the material considered of value. For example, referring to FIG. 1, the mine 101 is shown with its valuable material 102 situated at a distance below the ground surface 103. In the past, most of the (waste) material 104 had to be removed so that the valuable material 102 could be exposed and extracted from the mine 101. In the past, this waste material was removed in a series of progressive layers 105, which are ever diminishing in area, until the valuable material 102 was exposed for extraction. This is not considered to be an efficient mining process, as a great deal of waste material must be removed, stored and returned at a later time to the mine site 101, in order to extract the valuable material 102. It is desirable to reduce the volume of waste material that must be removed prior to extracting the valuable material.

The open cut method exemplified in FIG. 1 is viewed as particularly inefficient where the valuable resource is located to one side of the pit 105 of a desirable mine site 101. For example, FIG. 2 illustrates such a situation. The valuable material 102 is located to one side of the pit 105. In such a situation, it is not considered efficient to remove the waste material 104 from region 206, that is where the waste material is not located relatively close to the valuable material 102, but it is considered desirable to remove the waste material 104 from region 207, that is where it is located nearer to the valuable material 102. This then brings other considerations to the fore. For example, it would be desirable to determine the boundary between regions 206 and 207, so that not too much undesirable waste material is removed (region 206), yet enough is removed to ensure safety factors are considered, such as cave-ins, etc. This then leads to a further consideration of the need to design a 'pit' 105 with a relatively optimal design having consideration for the location of the valuable material, relative to the waste material and other issues, such as safety factors.

This further consideration has led to an analysis of pit design, and a technique of removing waste material and valuable material called 'pushbacks'. This technique is illustrated in FIG. 3. Basically, the pit 105 is designed to an extent that the waste material 104 to be removed is minimised, but still enabling extraction of the valuable material 102. The technique uses 'blocks' 308 which represent smaller volumes of material. The area proximate the valuable material is divided into a number of blocks 308. It is then a matter of determining which blocks need to be removed in order to enable access to the valuable material 102. This determination of 'blocks 308', then gives rise to the design or extent of the pit 105.

FIG. 3 represents the mine as a two dimensional area, however, it should be appreciated that the mine is a three dimensional area. Thus the blocks 308 to be removed are determined in phases, and cones, which represent more accurately a three dimensional 'volume' which volume will ultimately form the pit 105.

Further consideration can be given to the prior art situation illustrated in FIG. 3. Consideration should be given to the scheduling of the removal of blocks. In effect, what is the best order of block removal, when other business aspects such as time/value and discounted cash flows are taken into account? There is a need to find a relatively optimal order of block removal which gives a relatively maximum value for a relatively minimum effort/time.

Attempts have been made in the past to find this 'optimum' block order by determining which block(s) 308 should be removed relative to a 'violation free' order. Tuning to the illustration in FIG. 4, a pit 105 is shown with valuable material 102. For the purposes of discussion, if it was desirable to remove block 414, then there is considered to be a 'violation' if we determined a schedule of block removal which started by removing block 414 or blocks 414, 412 & 413 before blocks 409, 410 and 411 were removed. In other words, a violation free schedule would seek to remove other blocks 409, 410, 411, 412 and 413 before block 414. (It is important to note that the block number does not necessarily indicate a preferential order of block removal).

It can also be seen that this block scheduling can be extended to the entire pit 105 in order to remove the waste material 104 and the valuable material 102. With this violation free order schedule in mind, prior art attempts have been made. FIG. 5 illustrates one such attempt. Taking the blocks of FIG. 4, the blocks are numbered and sorted according to a 'mineable block order' having regard to practical mining techniques and other mine factors, such as safety etc and is illustrated by table 615. The blocks in table 515 are then sorted 516 with regard to Net Present Value (NPV) and is based on push back design via Life-of-mine NPV sequencing, taking into account obtaining the most value block from the ground at the earliest time. To illustrate the NPV sorting, and turning again to FIG. 4, there is a question as which of blocks 409, 410 or 411 should be removed first. All three blocks can be removed from the point of view of the ability to mine them, but it may, for example, be more economic to remove block 410, before block 409. Removing blocks 409, 410 or 411 does not lead to 'violations' thus consideration can be given to the order of block removal which is more economic.

NPV sorting is conducted in a manner which does not lead to violations of the 'violation free order', and provides a table 517 listing an 'executable block order'. In other words, this prior art technique leads to a listing of blocks, in an order which determines their removal having regard to the ability to mine them, and the economic return for doing so.

Nonetheless, the foregoing description and prior art techniques, are considered to ignore a number of key problems encountered in a typical mine implementation. An ore body in the ground is typically modeled as a three-dimensional grid of blocks. Each of these blocks has attributes, such as the tonnage of rock and ore contained in the block. Given a three-dimensional block model of an ore body, the mine planner determines an extraction schedule (an extraction ordering of the blocks). In practice, an extraction must satisfy a number of constraints. For example, wall slopes must be maintained below a defined value to avoid pit walls collapsing and the rates of both removal of earth from the pit (mining rate) and ore processing (processing rate) must not exceed given limits. The wall slope constraints are usually taken into account using precedence relations between blocks. The removal of a given block requires the earlier removal of several blocks above it; that is removal of these several blocks must precede removal of the given block.

Typically, the blocks of highest value lie near the bottom of the ore body, far underneath the ground. A cash flow stream is generated when these blocks are excavated and the ore within them is sold. Because one can earn interest on cash received earlier, the value of a block increases if it is excavated earlier, and decreases (or is discounted) if it is excavated later. This concept of discounting is central to the notion of net present value (NPV). Thus the mine planner seeks an extraction schedule that maximizes the net present value of the ore body. The, net present value forms the objective function of this optimization problem.

Calculating the NPV of an extraction schedule is far from easy. In current approaches, each block is simply ascribed a value in dollars, but in many cases, this value may be only a very crude approximation, and subject to change. For commodities such as copper, the planner needs to know Fe metal content of the block, the selling price at all future times within the planning horizon, the mining/processing costs, and some other factors. This is a difficult and problematic in itself.

However, for blended products such as coal or iron ore, the problem is considered even more difficult. This follows from the fact that the values of individual blocks are not known until those blocks have been blended with other blocks to form a saleable product. An individual block may be of sufficiently low quality to be considered worthless or waste material in isolation. A block having a relatively average quality may attract a certain price, given the price set for the material is based on a minimum quality level. Thus when a block having a relatively higher quality is extracted, this block will receive only the same value as the average quality block because the value is based on a minimum quality level. For this reason, the low quality block, when blended with the high quality block result in a volume of ore at or above the minimum quality level and thus the two ore blocks may be both sold. This 'blended' price is significantly more than the low quality and high quality blocks would be worth in isolation. This enables more revenues to be achieved from the extraction of resource(s). Blending is also particularly valuable for smoothing the grade of ore blocks sold when the grade of ore blocks coming out of the pit is relatively erratic. Thus, the value of a block is unknown until it is part of a blended extraction schedule.

In addition to the factors described above, the sheer dimensions of the problem confronting a mine planner, with hundreds of thousands of blocks and up to a 30-year time horizon make it very difficult to find an extraction schedule that maximizes the total NPV of the mine very difficult.

It is considered that some prior art approaches approximate heavily, by aggregating either blocks or time periods, are considered to solve the problem in a piecemeal fashion, or relying on heuristic methods. The treatment of blending is considered to be done by relatively crude approximations. The prior art assumes a value and then seeks to optimise a schedule. But if the assumed value is not correct, especially over a relatively long period of time, then the schedule could not be considered optimal.

Other prior art approaches, in the form of some commercial software, enable post-schedule blend optimization to be performed. The software determines an extraction schedule based on estimated "in pit" valuation of each block, and then a blending schedule is developed based on the extraction sequence given. This is considered not very accurate in a commercial situation as the in-pit valuations are estimates, and thus may be far from reflecting a true resulting blended value. Furthermore, the blending schedule itself is often determined by heuristic methods, which may yield far from optimal solutions.

The Whittle Four-X Analyser (by Whittle Pty Ltd) attempts to integrate scheduling and blending by iteratively updating the schedule and blend using a hill-climbing heuristic, although the blending optimization is still local in time. Mine-MAX (by MineMax Pty Ltd) and ECSI Minex Maximiser (by ECS International Pty Ltd) have partially integrated scheduling and blending. However, the blocks are valued "in ground" in isolation, riot as part of a blend, and the blending optimization is performed locally in time due to problem size limitations.

Given the importance of blending, it is essential to consider these factors as an integral part of schedule development improvements in the accuracy of the mine model and analysis techniques will dearly lead to increased mine value which can lead to increased revenues in the order of many millions of dollars over the life of a relatively large mine.

With regard to prior art techniques, in as much as the removal of material is concerned, is based substantially on the assumption that the data gathered from sample drillings is an accurate reflection of the homogeneity of the entire mine pit. Unfortunately, in many cases of the prior art, what has been revealed underneath the ground over the life of the mine, has differed from what was 'expected' to be found based on the sample drillings and geological survey data initially obtained. The difference may manifest itself in grade of material or waste.

Although the difference may be marginal from one block to another, or with regard to a slight variation in grade or quality of ore, when taken globally over a mine project both in magnitude and time, the difference can represent many millions of dollars between what actually was mined, and what was expected when the mine was designed.

One reason for this is that the design of prior art mines is based substantially entirely on this sample, geological survey data. Thus if the data is wrong, or inaccurate, then the design established for the mine will not be found to be optimal for that particular mine location. Again, unfortunately, this will usually only be realised well after the design has been established and implemented. By this time it is, or it may be considered, too late to correct or alter the mine design. The result will be this (wasteful) expenditure of possibly many millions of dollars in creating a mine according to a design that was not 'optimal'.

In considering the problem posed, it will be helpful to gain a better understanding of prior art mine 'design' techniques. In general, a geographical survey establishes data used as the basis of a mine design. The 'design' is necessary to provide determination of the various commercial aspects associated with a mine, and for establishing a block 'schedule'; that is an executable order of blocks from the mine.

This survey data manifests itself in, for example, 10 or 20 different samples and analyses of the potential mine location and site. A number of simulations and interpolations are made based on the data in order to predict a mine plan, which can be considered an order for taking material (ore and/or waste) from the location of the potential mine. It is then necessary to establish 'the' (one) mine plan which is to be implemented.

Typically, the blocks of highest value lie near the bottom of the ore body, far underneath the ground. A cash flow stream is generated when these blocks are excavated and the ore within them is sold. Because one can earn interest on cash received earlier, the value of a block increases if it is excavated earlier, and decreases (or is discounted) if it is excavated later. This concept of discounting is central to the notion of net present value (NPV). Thus the mine planner seeks an extraction schedule that maximizes the net present value of the ore body. The net present value forms the objective function of this optimization problem.

As previously mentioned, calculating the NPV of an extraction schedule is far from easy. In current approaches, each block is simply ascribed a value in dollars, but in many cases, this value may be only a very crude approximation, and subject to change. For commodities such as copper, the planner needs to know the metal content of the block, the selling price at all future times within the planning horizon, the mining/processing costs, and some other factors. This is a difficult and problematic in itself.

In some cases, a random selection may have been made from the simulations and interpolations. An example of this is "AN APPLICATION OF BRANCH AND CUT TO OPEN PIT MINE SCHEDULING" by Louis Caccetta and Stephen P. Hill. A copy may be found at website: http://rutcor.rutgers.edu/~do99/EA/SHij1.doc.

In other instances, an 'average' of the various simulations is taken and which assumes a fixed pricing in the interpolation(s) calculated, where the 'average' has been taken as 'the' mine design.

Furthermore, a number of prior art techniques are considered to take a relatively simple view of the problems confronted by the mine designer in a 'real world' mine situation. For example, the size, complexity, nature of blocks, grade and other engineering constraints and time taken to undertake a mining operation is often not fully taken into account in prior art techniques, leading to computational problems or errors in the mine design. Such errors can have significant financial and safety implications for the mine operator.

With regard to size, for example, prior art techniques fall to adequately take account of the size of a 'block'. Depending on the size of the overall project, a 'block' may be quite large, taking some weeks, months or even years to mine. If this is the case, many assumptions made in prior art techniques fail to give sufficient accuracy for the modern day business environment.

Given that many of the mine designs are mathematically and computational complex, according to prior art techniques, if the size of the blocks were reduced for greater accuracy, the result will be that either the optimisation techniques used will be time in feasible ( that is they will take an inordinately long time to complete), or other assumptions will have to be made concerning aspects of the mine design such as mining rates, processing rates, etc which will result in a decrease the accuracy of the mine design solution.

Some examples of commercial software do use mixed integer programming engines, however, the method of aggregating blocks requires further improvement. For example, it is considered that product 'ECSI Maximiser' by ECS international Pty Ltd uses a form of integer optimisation in their pushback design, but the optimisation is local in time, and it's problem formulation is considered too large to optimise globally over the life of a mine. Also the product 'MineMax' by MineMAX Ptd Ltd may be used to find a rudimentary optimal block sequencing with a mixed integer programming engine, however it is considered that its method of aggregation does not respect slopes as is required in many situations. 'MineMax' also optimises locally in time, and not globally. Thus, where there is a large number of variables, the user must resort to subdividing the pit into separate sections, and perform separate optimisations on each section, and thus the optimisation is not global over the entire pit it is considered desirable to have an optimisation that is global in both space and time.

There still exists a need, however, to improve prior art techniques. Given that mining projects, on the whole, are relatively large scale operations, even small improvements in prior art techniques can represent millions of dollars in savings, and/or greater productivity and/or safety. There is a need to improve mine design and/or the method(s) used to design a mine.

An object of the present invention is to provide an improved method of determining a cluster.

Another object of the present invention is to alleviate at least one disadvantage of the prior art.

Another object of the present invention is to provide an improved method of block removal, and/or an improved pit design and/or executable block order.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

SUMMARY OF INVENTION

The present invention provides, in one aspect, a method of determining the removal of material(s) from a location, the method including the steps of calculating revenue, and determining a schedule with regard to grade constraints.

The present invention provides in another aspect, a method of determining the removal of material(s) from a location, the method including the steps of calculating revenue, and determining a schedule with regard to impurity constraints.

Preferably, the determination of the schedule is made with regard to both grade and impurity.

The present invention provides, in still another aspect, the determination of a schedule according to the expression 1 as herein disclosed.

The present invention provides in a further aspect, the determination of a revenue associated with a schedule allowing for whole and/or fractional block/clump and/or panel(s).

In essence, in this inventive aspect, the present invention, seeks to blend material mined in order to provide saleable material, preferably of a greater volume than material of value extracted directly from a mine. In other words, the present invention, based on knowledge of the grade and impurity of each block/clump/panel, includes such information into the schedule iteration. The schedule, in accordance with the present invention, is therefore calculated taking Into account grade and impurity over a period of time, for example, 1 year. These factors may also be utilised in integer programs.

Another inventive aspect of the present invention serves to provide a revenue determination as whole or partial blocks, clumps and/or panels. This information can be used in determining schedule(s).

Advantageously, it has been found that the present invention provides the ability to relatively maximise the volume of material for which revenues can be generated from a mining operation.

The present invention may be used, for example, by mine planners to design open cut mines, but the present invention should not be limited to only such an application.

The present invention provides, in a second inventive aspect, in a system and method of determining the removal of material(s) of a differing relative value, from a location, including:

determining the approximate volume of material to be removed, dividing the volume to be removed into at least two blocks, attributing a relative value to each block, the improvement including:

sorting each of the blocks according to its value, listing each block and its associated value in a table, irrespective of violation(s).

In essence, this aspect serves to grade blocks in value order, such as highest to lowest. One benefit is that, in a given time, the most valuable return may be obtained from the blocks that are extracted. Preferably, the block list above may be resorted to reduce violations. This provides improved accuracy and/or practicality to the order of block removal.

The present invention also provides, in another aspect, a system and method of reducing violations in the removal of material(s) in block(s) of a differing relative value from a location, the system or method including:

selecting a block, determining a cone corresponding to the selected block, determining violations attributed to the cone, determining a new position of the cone with reference to reduced violations.

In essence, this aspect serves to provide a relatively improved or substantially violation free order of the block extraction order. Reducing violations improves the ability or difficulty in extracting blocks.

The present invention also provides, in still another inventive aspect, a system and method of reducing violations in the removal of material(s) in block(s) of a differing relative value from a location, the system or method including:

selecting a block, determining a cone corresponding to the selected block, determining violations attributed to the cone, determining a new position of the cone with reference to improved NPV.

In essence, this third aspect serves to determine an extraction order which takes into account (at least partially) issues of business accounting, such as NPV, being Net Present Value. This aspect takes into account that, in a given time, the most valuable return may be obtained from the blocks that are extracted substantially corresponding to a block extraction order determined at least partially in accordance with the principles of NPV. Preferably, the second and third aspects are both taken into consideration.

In the removal of material(s) in block(s) of a differing relative value from a location, the present invention provides, in another aspect, a system and method of determining a new cone position in a stack, the system or method including:

determining a number of violations associated with a first cone position, determining a number of violations associated with a second cone position, the second cone position having less than or an equal number of violations as the first cone position, selecting as the new cone position, the second cone position.

Preferably, the second cone position is determined iteratvely and/or randomly. This aspect of the invention serves to improve violation free orders.

The present invention provides, in a third inventive aspect, a method of determining the removal of material(s) from a location, including selecting a value of risk, calculating a corresponding return, and determining a schedule corresponding to the risk and/or return.

In essence, the present invention, a design to be configured to account for (multiple) representations of the mine location and/or ore body based, at least in part, on a risk vs. return basis.

The present invention provides, in a fourth inventive aspect, a method and apparatus for determining an aggregated block ordering for the extraction, of material from a location, the method including the steps of, from a block sequence in a raw form, clustering blocks according to spatial coordinates x, y and z, and a further variable 'v'.

Preferably, the present invention further includes the step of propagating the cluster(s) in a relatively time ordered way to produce pushbacks.

Preferably, the present invention further includes the steps of, after propagating to find pushbacks, valuing, and feeding back the value information to the choice of cluster parameters.

In essence, the present invention, in this aspect of invention, referred to as fuzzy clustering; second identification of clusters for pushback design, clusters blocks according to their spatial position and their time of extraction. This is considered necessary because, if pushbacks were formed from the block sequence in its raw form, the pushbacks would be generally highly fragmented and considered non-mineable. This form of clustering is considered to give control over the connectivity and mineablilty of the resulting pushbacks. A block sequence in a raw form is a block sequence derived from a clump schedule.

In essence, the present invention, in another aspect of invention, referred to as fuzzy clustering; alternative 1, clusters blocks according to their spatial position and their time of extraction. The clusters may be controlled to be a certain size, or have a certain rock tonnage or ore tonnage. The shapes of the dusters may be controlled through parameters that balance the space and the time coordinate. The advantage of shape control is to produce pushbacks that are mineable and not fragmented. The advantage of size control is the ability to control stripping ratios in years where the mill may be operating under capacity.

In essence, the present invention, in a further aspect of invention, referred to as fuzzy clustering; alternative 2, propagates inverted cones from the clusters identified in the secondary clustering. The clusters in the secondary, clustering are time ordered, and the propagation occurs in this time order, with no intersections of inverted cones allowed. Advantageously, this provides the ability to extract pushbacks from the block ordering that are well connected and mineable, while retaining the bulk of the NPV optimality of the block sequence.

In essence, the present invention, in yet another aspect of invention, referred to as fuzzy clustering; alternative 3, provides the creation of a feedback loop of clustering, propagating to find pushbacks, valuing relatively quickly, and then feeding this information back into the choice of clustering parameters. The advantage of this is that the effect of different clustering parameters may be very quickly checked for NPV and mineability. It is heretofore been virtually impossible to evaluate a pushback design for NPV and mineability before it has been constructed, and the fast process loop of this aspect allows many high-quality pushbacks designs to be constructed and evaluated (by the human eye in the case of mineability).

In other words the present invention discloses the determination of a cluster, what are the considerations for clustering, and the advantages of clustering. Furthermore, the present invention, and its various aspects disclose clustering based on various considerations, such as x, y, and z coordinates, and/or a variable 'v', where 'v' represents value, distance from a centre point, mineability, time, ore type, size, control, and other characteristics or properties as considered appropriate given the nature of the cluster to be formed and/or analysed.

The present invention provides, in a fifth inventive aspect, a method of and apparatus for determining a mine design, the method including the steps of determining a plurality of blocks in the mine, aggregating at least a portion of the blocks, providing a block sequence using an integer program, and refining the sequence according to predetermined criteria.

Preferably, the present invention provides a method of designing a mine substantially in accordance with FIG. 13 as disclosed herein.

In essence, the present invention, in this aspect of invention, referred to as Generic Klumpking, a method of mine design that firstly, uses aggregation to reduce the number of variables via a spataial/value clustering and propagation to form clumps. Secondly, the inclusion of mining and processing constraints in an integer program based around the clump variables to ultimately produce an optimal block sequence. Thirdly, the rapid loop of clustering blocks in this optimal sequence according to space/time of extraction and propagating these clusters to form pushbacks, interrogating them for value and mineability, and adjusting clustering parameters as needed.

In other words, the present invention provides a relatively general process and apparatus for addressing problems faced by mine planners in pushback design.

In the aspect of invention referred to as Generic Klumpking, there is a method of mine design that firstly, is considered a clever choice of aggregation to reduce the number of variables via a spatial/value clustering and propagation to form clumps. Secondly, the inclusion of mining and processing constraints in an integer program based around the clump variables to ultimately produce an optimal block sequence. Thirdly, the rapid loop of clustering blocks in this optimal sequence according to space/time of extraction and propagating these clusters to form pushbacks, interrogating them for value and mineability, and adjusting clustering parameters as needed.

The present invention provides, in a sixth inventive aspect, a method of and apparatus for determining a schedule for extraction of clump(s), the method including determining a period of time corresponding to at least a portion of the dump(s), and assigning the period of time to the portion of clump(s).

The present aspect also provides a method of determining an extraction order of block(s) from corresponding clump(s), the method including:

performing the method of determining a schedule as disclosed herein, determining which portion(s) of clump(s) have been assigned the same period of time, and joining together blocks located in the portion(s) having the same period of time.

The method(s), systems and techniques disclosed in this application may be used in conjunction with prior art integer programming engines. Many aspects of the present disclosure serve to improve the performance of the use of such engines and the use of other known mine design techniques.

In essence, the present aspect, referred to as Determination of a block ordering from a clump ordering, turns a dump ordering into an ordering of blocks. This is, in effect, a de aggregation. Using techniques disclosed herein, an integer program engine may be used on the relatively small number of clumps, and thus the result can now be translated back into the large number of small blocks.

In other words, the present invention involves, in part, determining a block list or order for extraction on a periodic or period, time basis.

Other related aspects of invention, include:

A related aspect of invention, referred to as initial identification of Clusters, which in essence aggregates a number of blocks into collections or clusters. The clusters preferably more sharply identify regions of high-grade and low-grade materials, while maintaining a spatial compactness of a cluster. The dusters are formed by blocks having certain x, y, z spatial coordinates, combined with another coordinate, representing a number of selected values, such as grade or value. The advantage of this is to produce inverted cones that are relatively tightly focused around regions of high grade so as not to necessitate extra stripping.

Another related aspect of invention, referred to as Propagation of clusters and formation of dumps, in essence forms relatively minimal inverted cones with dusters at their apex and intersects these cones to form clumps, or aggregations of blocks that respect slope constraints. Advantageously, it has been found that aggregating the small blocks in an intelligent way serves to reduce the number of "atoms" variables to be fed into the mixed integer programming engine. The clumps allow relatively maximum flexibility in potential mining schedules, while keeping variable numbers to a minimum. The collection of clumps has three important properties. Firstly, the dumps allow access to all the targets as quickly as possible (minimality), and secondly the dumps allow many possible orders of access to the identified ore targets (flexibility). Thirdly, because cones are used, and due to the nature of the cone(s), an extraction ordering of the clumps that is feasible according to the precedence arcs will automatically respect and accommodate minimum slope constraints. Thus, the slope constraints are automatically built into this aspect of invention.

Another related aspect of invention, referred to as splitting of waste and ore in dumps, is in essence based on the realization that clumps contain both ore blocks and waste blocks. Many integer programs assume that the value is distributed uniformly within a clump. This is, however, not true. Typically, clumps will have higher value near their base. This is because most of the value is lower underground while closer to the surface one tends to have more waste blocks. By splitting the clump into relatively pure waste and desirable material, the assumption of uniformity of value for each portion of the clump is more accurate.

Still another related aspect of invention, referred to as Aggregation of blocks into clumps; high-level ideas, in essence seeks to reduce the number of variables to a relatively manageable amount for use in current technology of integer programming engines. Advantageously, this aspect enables the use of an integer programming engine and the ability to incorporate further constraints such as mining, processing, and marketing capacities, and grade constraints.

Yet another related aspect of invention, referred to as Determination of a block ordering from a clump ordering, turns a clump ordering into an ordering of blocks. This is, in effect, a de aggregation. Using techniques disclosed herein, an integer program engine may be used on the relatively small number of dumps, and thus the result can now be translated back into the large number of small blocks.

Other aspects and preferred aspects are disclosed in the specification and/or defined in the appended claims.

The method(s), systems and techniques disclosed in this application may be used in conjunction with prior art integer programming engines. Many aspects of the present disclosure serve to improve the performance of the use of such engines and the use of other known mine design techniques.

The present invention may be used, for example, by mine planners to design relatively optimal pushbacks for open cut mines. Advantageously, the present aspects of invention are considered different to prior art in that The present invention does not use either of the most common pit design algorithms (Lerchs-Grossmann or Floating Cone) but instead uses a unique concept of optima "clump" sequencing to develop an optimal block sequence that is then used as a basis for pushback design.

The design is relatively optimal with respect to properly discounted block values. No other pushback design software is considered to correctly allow for the effect of time (viz: block value discounting) in the pushback design step. Traditional phase designs ignore medium grade ore pods dose to the surface wit good NPV whilst focussing on higher value pods that may be deeply buried.

The present invention can properly address the so-called "Whittle-gap" problem where consecutive Lerchs-Grossmann shells can be very far apart, offering little temporal information. The present invention obtains relatively complete and accurate temporal information on the block ordering.

Process and mining constraints can be explicitly incorporated into the pushback design step.

The planner can rapidly design and value pushbacks that have different topologies, the trade-off being between pits with high NPV, but with difficult-to-mine (eg: ring) pushback shapes, and those with more mineable pushback shapes but lower NPV. The advantage of the more mineable pushback shapes is that much less NPV will be wasted in enforcing minimum mining width and in accommodating pit access (roads and berms).

The ability to quickly generate and evaluate a number of different sets of candidate pushback designs is a feature not allowed in traditional pushback design software where design options are usually fairly limited (eg: the amalgamation of adjacent Whittle shells into a single pushback)

Various aspects of the present invention also serve to improve the use of existing integer programming engines, such as "cplex" by ILOG.

provides a mining schedule can be found with maximal expected NPV for a given level of risk, does not produce schedules with expected NPV's that are below those possible for given levels of risk, the ability to relatively quickly generate and evaluate a number of different sets of candidate pushback designs. Such a feature not allowed for in prior art pushback design software where design options are usually fairly limited (eg: the amalgamation of adjacent Whittle shells into a single pushback), can be used in association with a unique concept of optimal "clump" sequencing to develop an optimal block sequence that is then used as a basis for pushback design, can be used in association with techniques which are relatively optimal with respect to properly discounted block values. Traditional phase designs ignore medium grade ore pods close to the surface with good NPV whilst focussing on higher value pods that may be deeply buried. Throughout the specification:

1. a 'collection' is a term for a group of objects,
2. a 'cluster' is a collection of ore blocks or blocks of otherwise desirable material that are relatively close to one another in terms of space and/or other attributes,
3. a 'dump' is formed from a cluster by first producing a substantially minimal inverted cone extending from the duster to the surface of the pit by propagating all blocks in the duster upwards using the arcs that describe the minimal slope constraints. Each cluster will have its own minimal inverted cone. These minimal inverted cones are then intersect with one another and the intersections form clumps,
4. an 'aggregation' is a term, although mostly applied to collections of blocks that are spatially connected (no "holes" in them). For example, a clump may be an aggregation, or may be "Super blocks" that are larger cubes made by joining together smaller cubes or blocks,
5. a 'panel' is a number of blocks in a layer (bench) within a pushback,
6. although the term violation free is used in the specification, this is not intended to mean that the entire order is violation free. The order may still include violations. The violations may be reduced in number, or at least not increased in number or difficulty,
7. although reference is made to 'a block' or 'blocks', it is to be noted that this should not be limited to some sort of cubic shape. A block(s) may refer to a region, volume or area of any dimension,
8. reference to a (single) block may also represent a number of blocks, and
9. if a first collection of blocks are to be removed, second and/or more corresponding collection(s) of blocks, which are pointed to by the first collection of blocks, are also to be removed prior to removal of the first collection of blocks.

DESCRIPTION OF DRAWINGS

Further disclosure, objects, advantages and aspects of the present application may be better understood by those skilled in the relevant art by reference to the following description of preferred embodiments taken in conjunction with the accompanying drawings, in which:

FIGS. 1 to 5 illustrate prior art mining techniques, and

DETAILED DESCRIPTION

In a preferred embodiment of the present invention, it is assumed that all blocks in this block model are of equal volume. The present invention has equal applicability to block(s), clump(s), panel(s) and/or any amount/volume of material. It is assumed that blended products are created, the sale price of which are dependent on the volume of product that meets certain specifications of grade and impurities.

Preferred embodiments of the present invention, and their associated aspects are described, for simplicity, in a two dimensional form. It will be understood that the principles and techniques disclosed are equally applicable to three dimensional situations.

Figure 1:
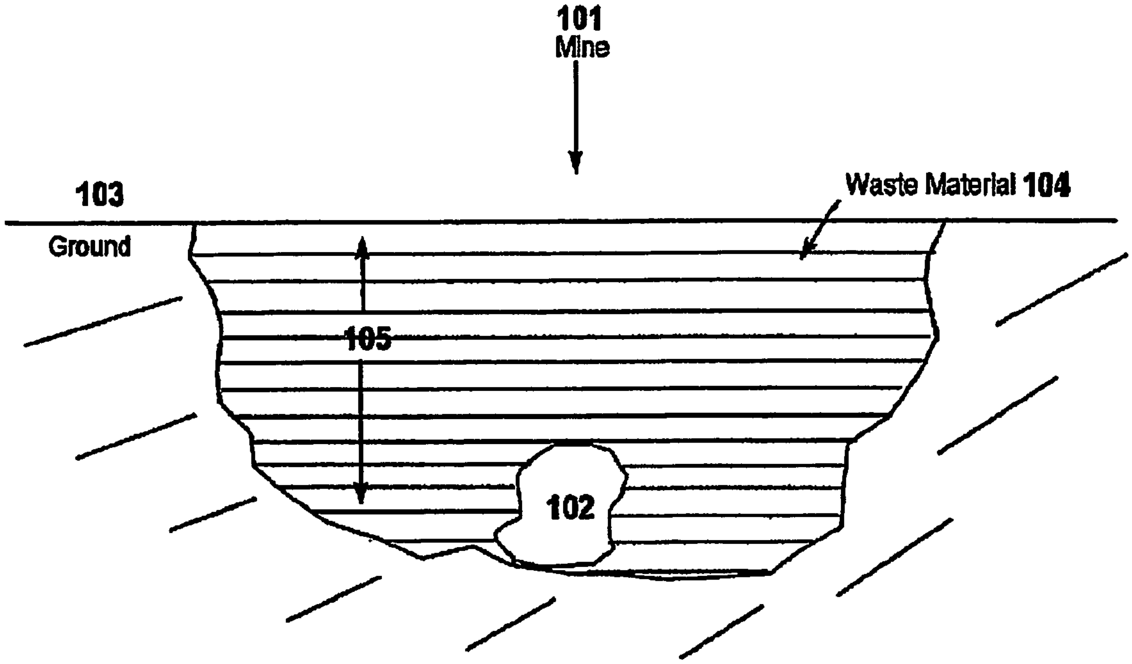
Figure 1 (prior art)
Figure 2:
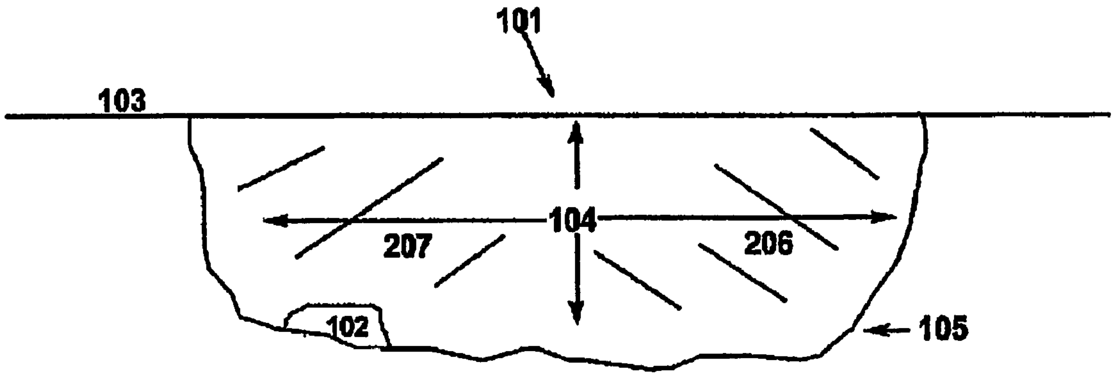
Figure 2 prior art
Figure 5:
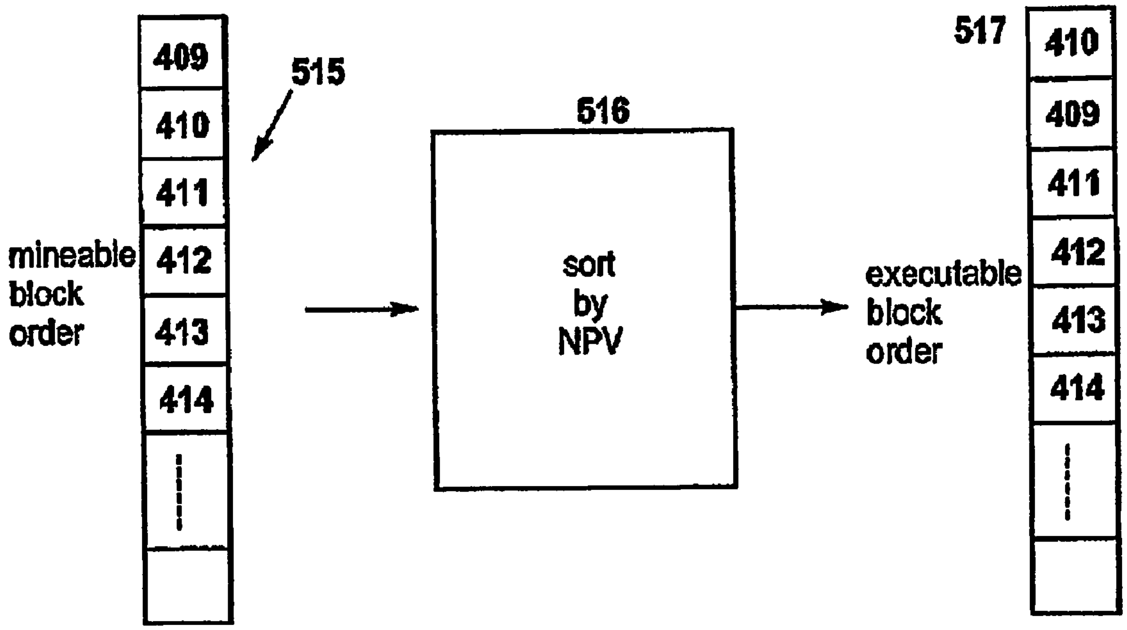
Figure 5 prior art
Figure 6:
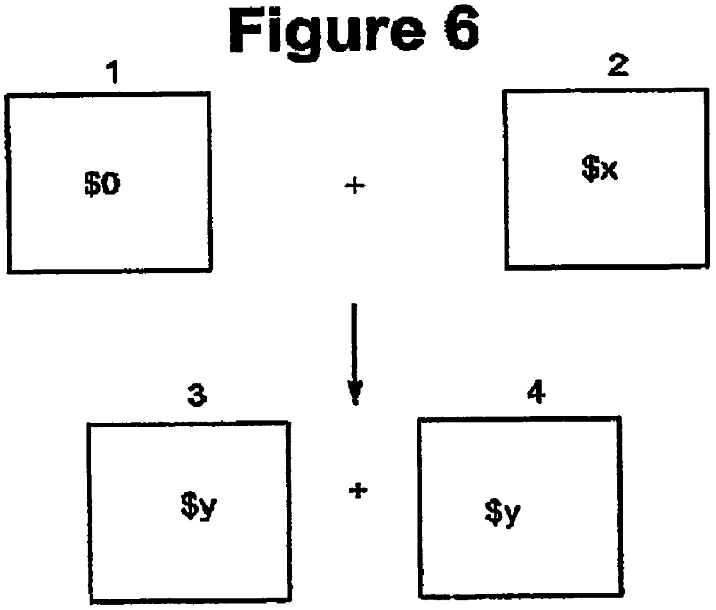
FIG. 6 illustrates schematically an application of the present invention.

For example, with reference to FIG. 6, there is shown illustratively the outcome of the blending of the present invention. In blending, a block/clump/panel 1 having relatively little, no, or waste value may be blended (that is mixed, at least in part) with a block 2 having a value $x of ore or material. In essence, the block 2, although it has a value of $x, will only achieve a sale price of $y that is the sale price agreed with the customer. This is the case because, as is often the case in the sale of mined materials, revenue generated by the sale of the material is usually based on a customer agreeing to pay a fixed price for material/blocks/clumps. The material sold must meet a certain minimum requirement, and 18 not usually based in the actual amount of ore or valuable material contained in each block/clump/panel. Thus, even though block 2 has a value $x, the customer will only pay an agreed price $y, for example. Thus, in the example illustrated, the mining of blocks 1 and 2 will only generate revenue of $y by the sale of block 2 and block 1 will be considered waste. Costs will be incurred also in disposing of the waste block 1.

In accordance with the present invention, however, block 1 and block 2 are blended in a manner which results in two blocks (3,4), each having a saleable revenue of $y. For the sake of illustration, the blending of these two blocks has resulted in two blocks, each of which at least meet the minimum saleable revenue of $y. The outcome of the blend, in the example illustrated is that two blocks/dumps/panels (3,4) are obtained, each with a revenue value of $y, and thus the overall revenue has been raised to 2×$y.

Calculation of Revenue

The embodiment of the present invention may be expressed as a formulation. In this regard, the mixed integer linear program to be solved seeks: relatively maximal NPV, as a function of (i) amount of blocks contributed toward each product, discounted appropriately, and taking into account selling revenue and blending/processing costs, (ii) mining costs, and (iii) costs of placing material on a waste dump.

In considering the present invention, previous techniques have assumed a value for each block/clump/panel. In a blended volume of material, the value cannot be assumed over a period of time. Thus, in accordance with the present invention, revenue which represents a consideration in a mine design, may be expressed as:

$$\text{(Revenue) } R=\Sigma(A.D.F)-\Sigma(C.D.E)-\Sigma(W.D.(E-F)) \qquad \text{expression 1}$$

where:

A denotes the revenue received from a unit volume of product

C is mining cost per block, clump and/or panel

D represents a variable discount for future values of $v_i(\omega)$ in that $v_i(\omega)$ denotes the 'value' (in todays dollars) of a block/clump/panel having a identification number i, E is 1 if the block/clump/panel is excavated and 0 otherwise, F is a fraction of a block considered to be ore, and W is cost of waste per block/clump/panel.

To utilise the above expression, it may be input to a linear mixed integer program solver. In one embodiment, existing linear mixed integer programming solvers may be used to solve a program of the form:

$$\text{max Revenue} \qquad \text{expression 2}$$

subject to precedence constraints
production rate constraints
grade constraints
impurity constraints Constraints to be met are (i) arc precedence constraints, (ii) grade constraints, preferably on an annual basis for each product, (iii) impurity constraints, preferably on an annual basis for each product, and (iv) production constraints such as mining rate constraints, processing rate constraints and marketing rate constraints.

The integer program selects in a relatively NPV-optimal way: (i) when to excavate and process/blend blocks/clumps, (ii) what blocks/clumps to blend together to achieve grade and impurity, and (iii) how to allocate blocks/clumps (or portions of blocks) to make each product (or to assign to waste).

A Relatively "Ultimate Pit" for a Blended Mine

In a further aspect of the present invention, the problem of determining a relatively ultimate pit design is addressed. In other words, determining a relatively large pit (relatively large undiscounted value) that can conceivably encompass a schedule that will meet blend constraints.

This aspect of invention applies the above expression 2 to a single time period (in essence, everything is considered to happen instantaneously with no discounting). Essentially, everything occurs in one period. In this aspect, there are no production rate constraints, but the other constraints are retained. Furthermore, D−1 in expression 1.

Allowing for Fractions of Blocks/Clumps/Panels in Periods

There is a further need to allow for fractions of blocks/clumps/panels. This results because in a given time period, it is not always possible to extract and/or process a whole block/clump/panel. Thus only a fraction may be excavated and/or processed.

It has been advantageously determined that in order to allow for fractions of blocks/dumps/panels, in the above expression(s) 'E' can be replaced by a variable 'G', where:

the prescribed variable G represents a portion of a block/clump/panel, and, in where $0 \leqq G \leqq 1$ and $G \leqq E$.

In a second inventive aspect, the invention assesses inputs, such as ultimate pit, block values, slope constraints, mining rate and discount factor, and provides as an output an extraction time ordering of blocks that substantially maximises NPV and respects pit slope constraints.

Figure 7:
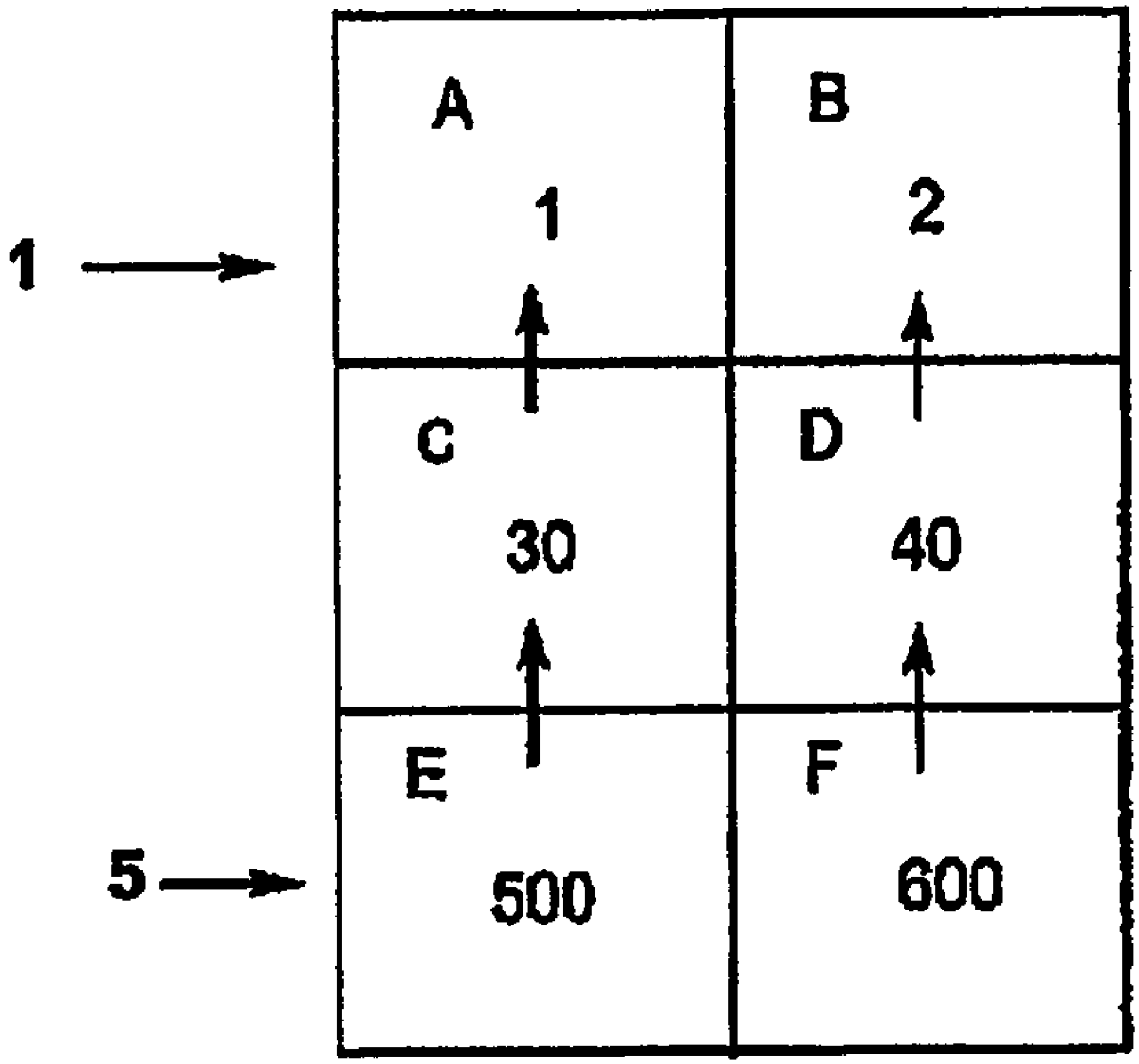
FIG. 7 illustrates a representation of a mine pit.

FIG. 7 represents an illustration of a pit 5 of a mine 1. The pit represents a volume of material that is to be removed. The pit is divided into (say) 6 blocks. Each block is identified by references A, B, C, D, E, and F. The value of each block is determined with reference to know criteria such as:

Selling price of ore per tonne, tonnage of ore contained in block, vertical position of block in pit, type of surrounding rock,
cost of mining,
cost of processing block,
cost of selling block.

These factors may be taken into consideration to obtain a net value for a block.

As will be described in more detail with reference to FIG. 11A, a number of the blocks form a cone. The cone is (usually) a three dimensional volume, taking into account more practical aspects of mining, such as various parameters, value, LUT and block model(s).

Figure 8:
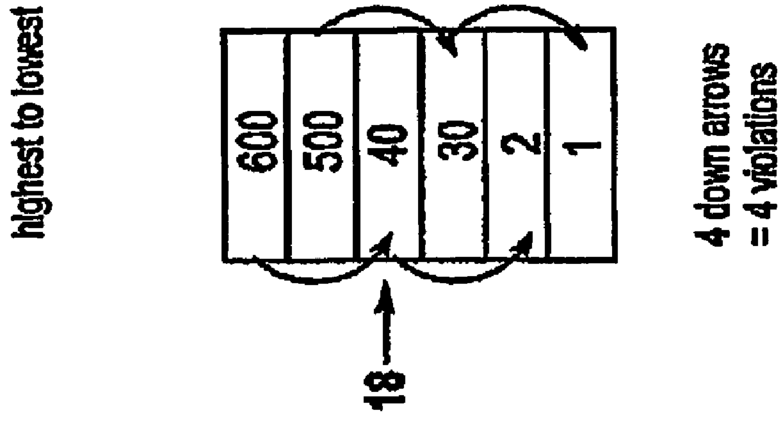
FIG. 8 illustrates one aspect of the present invention.

According to the first aspect of the present invention, the blocks are sorted according to their value and further processed or stored (in a table) accordingly. An example is illustrated in FIG. 8, where table 18 lists the blocks from highest value block to lowest value block. This aspect is considered unique, in as much as prior art techniques, first determine the listing of blocks according to the ease of mining each block, rather that (first) determining the listing of the blocks according to their value. One benefit of the present aspect is that by listing the blocks according to value, a global aspect is given to the local search that is performed subsequently. During the block/cone repositioning phase of a preferred form of the invention, the various aspects see nearby block orderings (this is from the "local" aspect). These aspects are therefore of a type of myopic or short sighted local search. This can be enhanced by starting the block ordering valued from highest to lowest thus giving a somewhat 'global' perspective to the invention.

Of course, the listing may be from lowest value to highest value, and the execution of the list may be done in reverse order. The principle is to determine a listing of blocks in a 'value order' so that removal of the blocks from the pit can be accomplished in an order presenting value. In a commercial aspect, the highest value is sought to be obtained in the quickest time, and thus the highest value block is sought to be mined the earliest so a relatively quick return can be obtained on the investment in the mining project.

Figure 9:
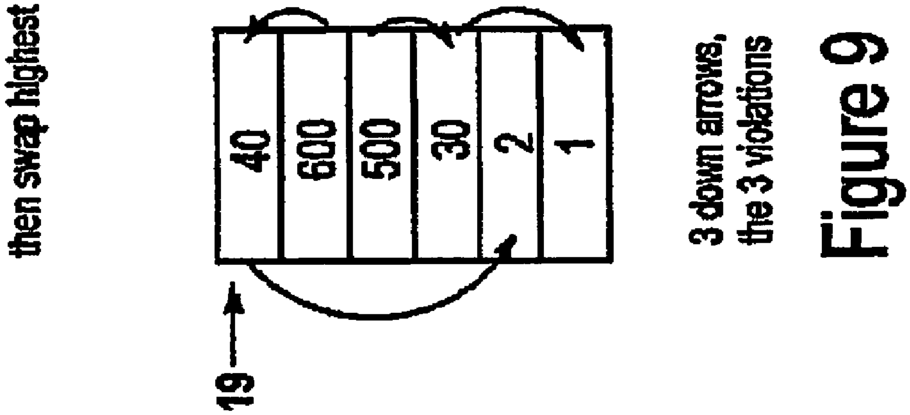
FIG. 9 illustrates a second aspect of the present invention.

As can be seen in FIG. 8, there are a number of violations, represented in the diagram by arrows pointing downwards. The violations occur as it is considered to be a violation to remove block 600, before first removing blocks located above it (as show in FIG. 7). Therefore, in a second aspect of the present invention, the blocks of table 18 are sorted to remove at least one violation, and again further processed or stored (in a table) accordingly. This is represented in FIG. 9 and table 19. Table 19 as shown has 3 downward pointing arrows, and thus 3 violations.

Figure 10:
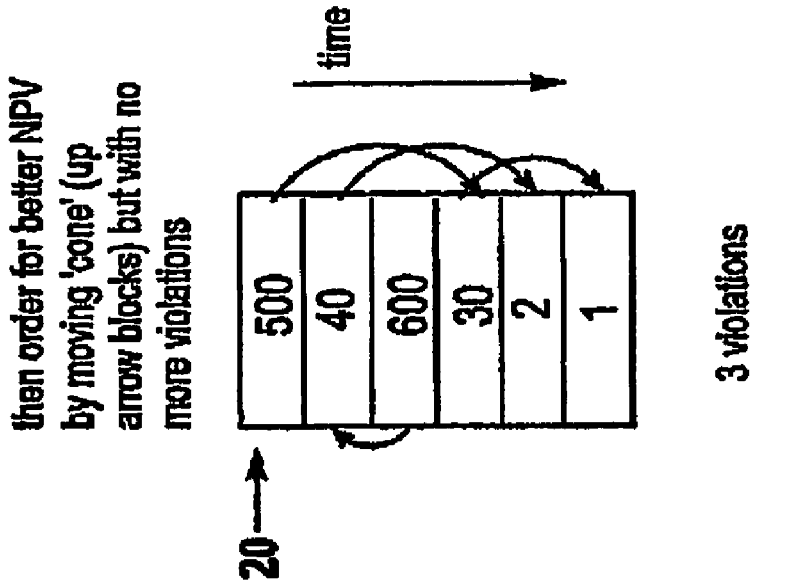
FIG. 10 illustrates a third aspect of the present invention.

The present invention as illustrated in FIG. 10 and table 20, shows the listing of table 19 are re sorted having regard to improving NPV, but without increasing the number of violations. Once again, the re-sorted list is further processed or stored (in a table) accordingly. NPV is increased in table 20, relative to table 19 in as much as black E of 500 value heads the table in table 20, whereas in table 19, block D of value 40 headed the table.

The present invention (preferably) then continues to (iteratively) process the tables to reduce violations and NPV, in accordance with the aspects illustrated in FIGS. 9 and 10. Preferably, the further processing continues until little or no further benefit can be obtained. At that point in time, the listing of the blocks is considered complete, resulting in what may be referred to as an executable block order, and removal of material in accordance with the list can be undertaken. Of course material can be removed in accordance with a partially iterated listing of blocks, but this may not be what is considered to be an 'optimal' listing of blocks. FIG. 10 shows an indication of time, giving some effect to a sequence of execution of the determination made in accordance with the present invention.

Figure 11A:
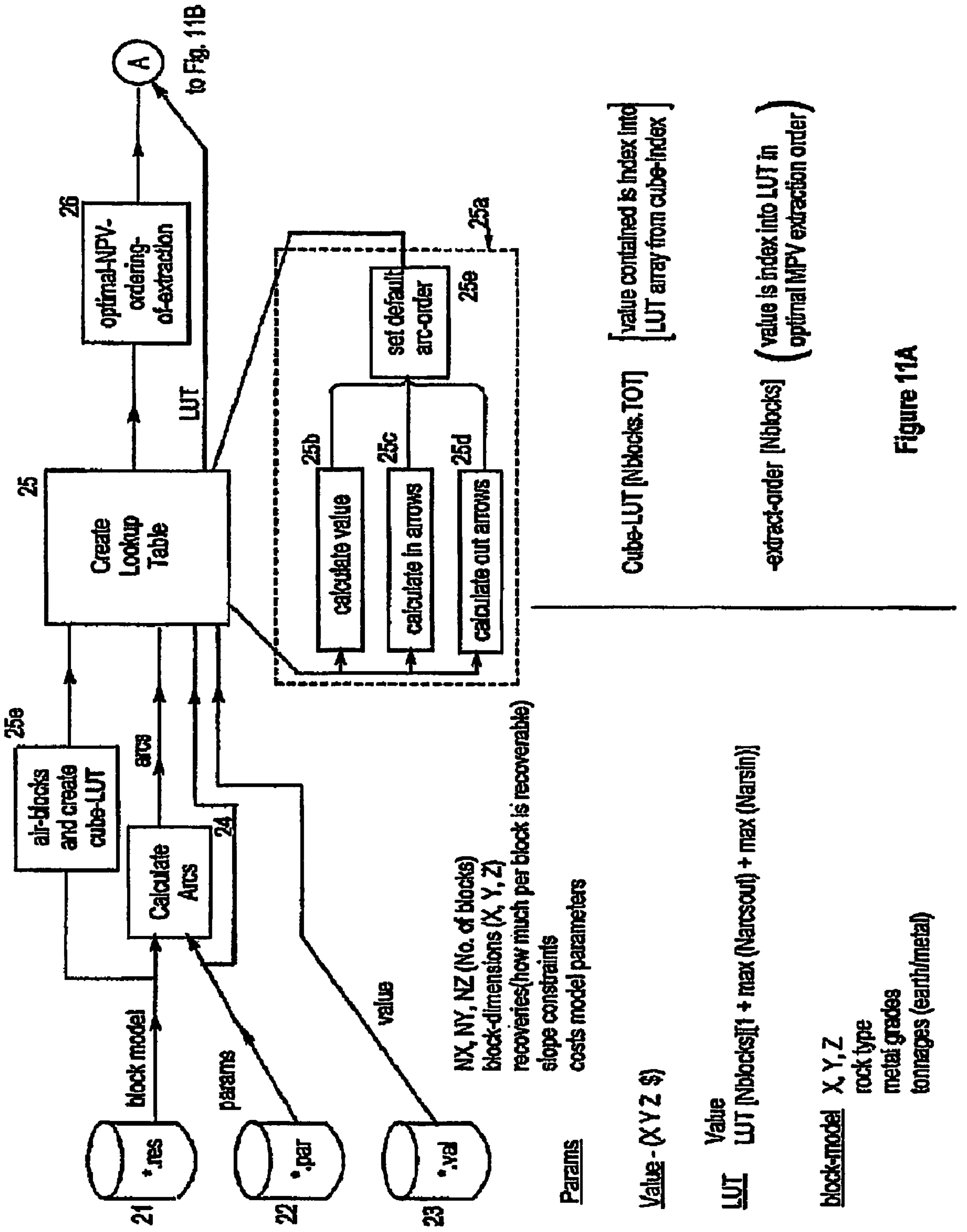
FIGS. 11A and 11B illustrate a second embodiment of the present invention.
Figure 11B:
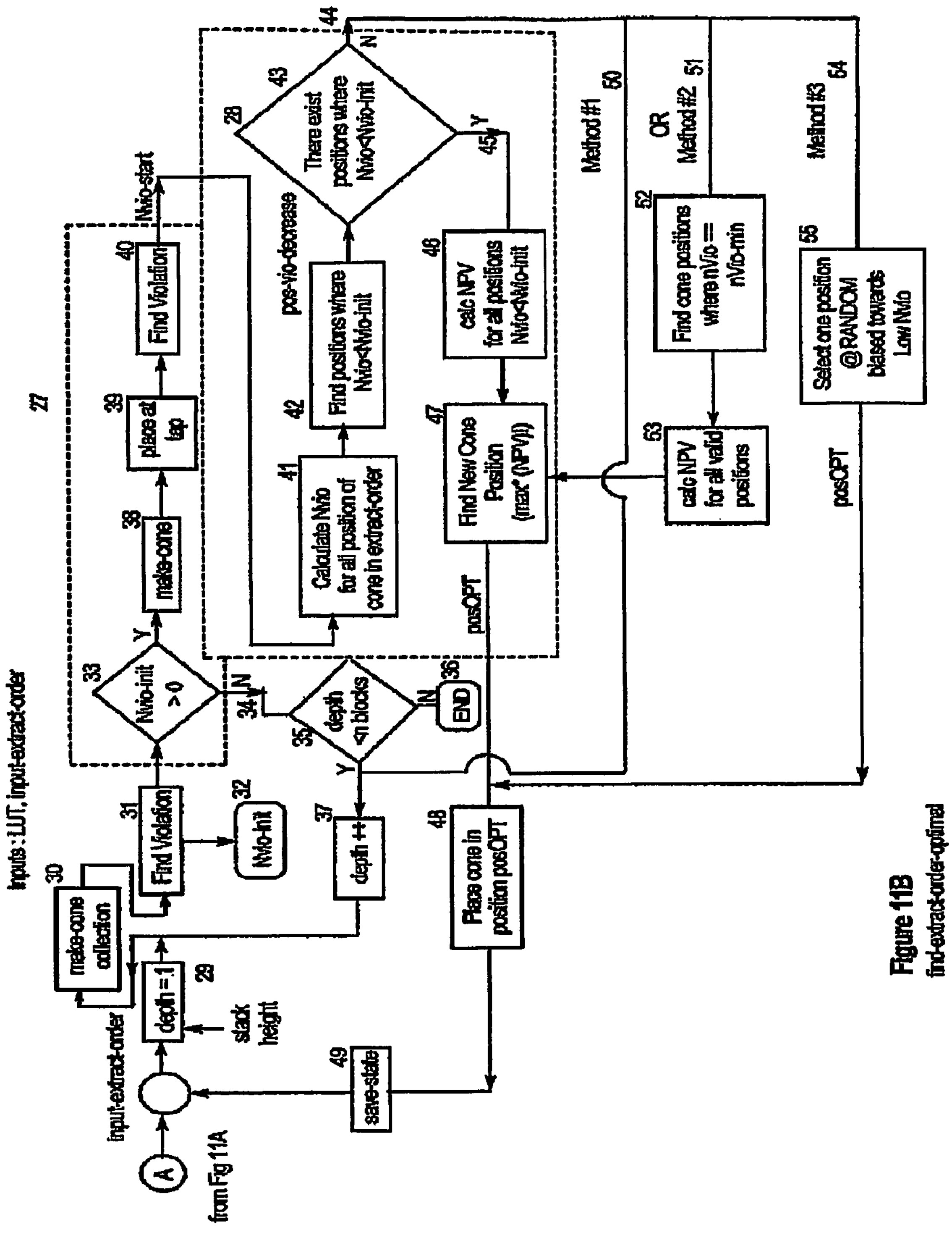

FIGS. 11A and 11B illustrate a second embodiment of the present invention, more specifically directed to implementing the invention as used in the mining industry. FIG. 11A illustrates, in schematic form, a system for calculating cone construction and implementing the first aspect disclosed above. A number of the blocks (as described in FIG. 4) form a cone. The cone is (usually) a three dimensional volume, taking into amount more practical aspects of mining, such as various parameters, value, LUT and block model(s).

Block model 21 is calculated based on X, Y, Z, rock type, metal grades, tonnages (earth/metal).

The various parameters 22 include block dimensions (X,Y, Z), number of locks (NX, NY, NZ), recoveries (how much per block is recoverable), slope constraints, and cost model parameters.

Value 23 is calculated based on (XYZ $). The ways of valuing each block may be the same as those described above in reference to FIG. 7. The (X Y Z $) simply describes a preferred form of a file format. The calculation of block values relies on many parameters, some of which are listed in reference to FIG. 6 above. Some of the information input to the present invention may be in the form of two-dimensional arrays. These arrays have four columns, namely x, y, z, $. Each row of this type of array refers to a single block, and the columns for entries of this row refer to the X coordinate, Y coordinate, z coordinate, and value, respectively.

The block model, parameters and value are used to calculate arcs 24. Given a particular block, we must calculate which arcs will emanate from the block, that is, which other blocks are pointed to by that block. How many blocks must be removed depends on the slope of the pit wall at that position in the pit. Different rock types require different slopes. Those rock types that are more prone to collapse require lower maximum slopes than those types of rocks that are not so prone to collapse. Mining engineers/geologists provide maximum slopes angles for each coordinate/block in the pit Slope constraints may be encoded by inter-block arcs. Based on the slope angle, one can extrapolate an inverted cone with apex at the particular block in question. Any blocks above the particular block in question that are contained within this cone should be pointed to or identified, either directly or indirectly, by the particular block in question.

Arcs, value, parameters and cube LUT are used as an input to a look up table 25. The output of the lookup table provides what is referred to as optimal NPV ordering of extraction 26. This is input to FIG. 11B and which is described in more detail below.

LUT(LookUp Table) is calculated based on value, and LUT(Nblocks)(1+max (narcsout)+max(Naresin)). By way of explanation, imagine that the three-dimensional grid representing the elements to be extracted contained in an open pit can be represented as a three dimensional array. Within this three dimensional array, each element represents a block. Using the kind of construction described above, it is relatively easy to determine which blocks are pointed to by another block However, the block/cone repositioning of the present invention uses blocks on a "stack" and does not directly use the three-dimensional coordinates of a block. Therefore a look up table is used to convert between a block number and its three-dimensional coordinates. In one embodiment of the present invention, we use four distinct look up tables, each of which represents aspects of table 25 and which are highlighted in the dotted block 25*a*.

Firstly, to calculate the value of a block 25*b*, second to calculate the arrows pointing into a block 25*c*, thirdly to calculate the arrows pointing out of a block 25*d*.

The look up table to calculate the values of a block 25*b* uses criteria, such as that described with reference to FIG. 7 above.

The look up table for calculating the arrows pointing into a block 25*c* consists of a two-dimensional array. This array has a number of rows equalling the number of blocks in the pit. The number of columns is equal to the maximum number of arcs pointing in to any block. Each row of this array contains block numbers of blocks pointing into the block represented by that row.

Likewise the look of table for calculating the arrows pointing out of a block 25*d* consists of a two-dimensional array. This array has a number of rows equalling the number of blocks in the pit. The number of columns is equal to the maximum number of arcs pointing out of any block. Each row of this array contains block numbers of blocks pointing out of the block represented by that row, and A 4th look up table 25*e* serves to correlate block numbers with their three-dimensional coordinates in the pit.

The LUT is sorted in accordance with the first aspect of the present invention, in which the blocks are sorted into a table in accordance with each blocks value, and which is described above.

FIG. 11B illustrates, in schematic form, a system for implementing the second and third aspects described above, which preferably takes input from FIG. 11A. The second aspect of the present invention is denoted 27. The third aspect of the present invention is denoted 28.

In explaining the FIGS. 11A and 11B, it is to be noted that the 'optimal' NPV ordering of extraction may not be an order of extraction which is most practical in the field to implement. Therefore, FIG. 11B applies a further series of processes to the output of FIG. 11A, with the aim of optimising (further) the order of extraction.

In explaining FIG. 11B, assume that the analysis begins at the top of a stack. The stack height is incremented by 1 at block 29, that is the next entry in the stack. A cone is determined 30 based on this entry, and any violations are determined 31. Where the present invention is making an initial determination, the Nvio (Number of Violations) may be reset at block 32.

At block 33, it is determined whether there are any violations. If there is not, path 34, then it is determined whether there are any more entries to be analysed 35. If it is the last entry, then the analysis ends at 36. If there are more entries to analyse, then the depth is incremented at 37, and the next cone collection is determined once again at block 30. If there are violations, a cone is configured 38, and this is placed on top of the stack 39. This is somewhat akin to the swapping of the highest as described with reference to FIG. 9 above, however, as will be described below, the exact positioning of the cone has yet to be determined. The number of violations 40 are again determined.

Block 28 (dotted) represents an embodiment of the second aspect of the present invention. That is the entry and associated cone are further processed to determine more optimal NPV, but with no more violations. In this regard, black 41 determines the number of violations for position(s) of the cone under consideration. The cone is moved along the stack 42 where a position of possible violation decrease is found. Have any positions been found where there is a violation decrease at 43? If a position(s) has been found, path 45 leads to a determination of those positions 46, and at 47 the position with the best (considered) position is determined. The cone is then placed in that position 48, and the position is saved 49. The next entry is then analysed again starting at block 29. If there has not been any improvement in decreasing the number of violations at 43, path 44 returns to consider a number of alternatives. One alternative is to return to consideration of the next entry in the stack at block 37. Another alternative 51, is to find the various (other) cone positions where the number of violations did not increase 52, and thereafter calculate the corresponding NPV for those other positions 53. The cone can then be moved to the position which has best considered NPV. As a further alternative 54, a new cone position can be selected randomly 55, with a bias to selecting positions with an improved NPV. The cone may then be placed 48 and stored 49 in this position. The saved state 49 also gives a listing of the current stack. This may be used at any time as the executable block order.

Although the description above describes the analysis of the various stack entries being 'moved', this may not necessarily happen in a physical sense. The various processes and determinations in accordance with the present invention may be performed by way of reference to a database coordinate or positioning of in a recording medium. A listing or representation of improved extraction information is sought as an output of the invention.

Other Issues

The present invention may incorporate better estimate of optimal cut-off grade in block valuation:

an improvement over marginal cut-off grade can dramatically affect NPV, (and probably the optimal pushback design). Therefore some consideration of cut-off grade should be included in pushback design.

The present invention may incorporate separate mining and processing rates:

timing of blocks depends on both the mining and processing rates. To more accurately estimate extraction time and improve the NPV-valuation model, proper consideration of processing time should be included in push back design.

The present invention may take into consideration blending aspects:

Deposits such as iron ore and coal provide new challenges, as the end products are typically created by blending together several blocks from the block model.

The final value of a block is therefore unknown until it has been blended with other blocks.

Block values cannot be considered in isolation when designing pushbacks, extraction schedules, and even the ultimate piti, but must be considered in conjunction with other (possibly spatially separated) blocks in the ore reserve.

A proper treatment of this aspect to rigorously maximise NPV is needed.

The present invention may take into consideration stochastic aspects:

The value assigned to a block in a three-dimensional block model is a single deterministic value.

In reality, the exact value is unknown and some blocks contain greater uncertainty than others (this uncertainty can be estimated via conditional simulations of the ore body).

Pushback designs that take into account the risk associated with ore grade uncertainty and aim for risk-minimal/return-maximal extraction schedules are needed.

in accordance with the third inventive aspect, a design is configured to account for (multiple) representations of the mine location and/or ore body based, at least in part, on a risk .vs. return basis.

The present invention calculates a NPV (which it has been realised can be used as a measure of 'return'). The present invention provides an indication of a relatively 'optimal', or at least a preferred, schedule in the presence of uncertainty. By "schedule" we mean to include at least (i) a schedule of blocks, (ii) a schedule of panels, and/or (iii) a schedule of clumps to form a block sequence and ultimately pushbacks.

In calculating NPV, let $v_{i,t}(\omega)$ denote a random variable describing the 'value' (in today's dollars) of a block/clump/panel having an identification number i in period t. The randomness can cover factors such as:

grade uncertainty (t-independent)
price/cost uncertainty
recovery uncertainty

Each ω is a sample "reality", by which is meant a 'possible value' of a block/clump/panel over a period of time, with an assigned relative probablity of occurring. Reality is a future outcome. The 'actual' price of a block in some future time is not known until that particular period of time. Also, the 'actual' ore/grade of a block is not known until it is actually mined and assayed. Thus, the present invention is implemented having regard to one or more 'possible values'. Each possible value is analysed further. Any variation of $v_{i,t}$ in t will be due substantially to price, cost, or recovery variation over time, not to discounting.

It has been realised, in accordance with the present invention, that since block values are random variables, so too is the NPV. Thus, the NPV for each block/clump/panel cart be expressed as expression 1, namely:

$$NPV=\Sigma v_{i,t}(\omega).D.E \qquad \text{expression 1}$$

where:

NPV is the sum of the random block values, appropriately discounted, in as far as, in considering the random block value, an annual (or period) discount factor and the block/clump/panel excavated and processed in the period can be taken into account, D represents a variable-discount for future values of $v_{i,t}(\omega)$, and E is 1 if the block/clump/panel is excavated and 0 otherwise.

Calculating Return

If risk is ignored, it is reasonable to aim for relatively maximal expected NPV, as noted above. It has been further realised, in accordance with the present invention, that the expected 'return' can be expressed with regard to average block values, namely $av(v_{i,t}(\omega))$ and thus the expected return can be expressed as expression 2:

$$\text{Return }(NPV)=\Sigma av(v_{i,t}(\omega)).D.E \qquad \text{expression 2}$$

where:

Return (NPV) is the sum of the average block values, appropriately discounted, in as far as, in considering the random block value, an annual (or period) discount factor and the block/clump/panel-excavated and processed in the period can be taken into, $av(v_{i,t}(\omega))$ is average block value, D represents a variable discount for future values of $v_{i,t}(\omega)$, and E is 1 If the block/clump/panel is excavated and 0 otherwise.

To utilise the above expression, it may be input to a linear mixed integer program solver. In one embodiment, existing linear mixed integer program solvers may be used to solve a program of the form:

$$\max \text{Return(NPV)} \qquad \text{expression 3}$$

subject to precedence constraints
production rate constraints

The relatively maximum return calculated corresponds to point Z in FIG. 12.

In dealing with production rate constraints. It has been realised that the production rate constraints are random constraints, as they are linked to ω. Thus, in accordance with one aspect of the present invention, average ore contents can be used in the constraints. Thus the production rate constraints can be expressed as:

$$\Sigma av(\text{ore content of block } i)\ (\omega).E\leqq\text{Max tonnes that can be processed in a period, such as 1 year} \qquad \text{expression 4}$$

Controlling Risk

A further aspect of the present invention calculates the variance in NPV, which has been realised can be used as a measure of 'risk'. Risk describes the variation of possible outcomes of the random variable NPV. The variance of NPV is therefore considered to be a way to measure risk.

$$Var(NPV)=F+G \qquad \text{expression 5}$$

where

F is (variance in $v_{i,t}(\omega)$).D.E

G is (covariance in $(v_{i,t}v_{j,z})$).D.E

D represents a variable discount for future values of $v_{i,t}(\omega)$, and

E is 1 if the block/clump/panel is excavated and 0 otherwise.

The value of $var(v_{i,t})$ and $cov(v_{i,t}v_{j,z})$ can be provided by the input data from conditional simulations and price models.

In order to utilise the above expression, it is preferred to aim for is relatively maximizing expected NPV, subject to some upper bound on the variance of NPV. This will provide a point on the "efficient frontier" in the "return/risk" plane as represented by the curve illustrated in FIG. 12.

In terms of expressing relatively maximum return on NPV:

$$\max \text{Return(NPV)} \qquad \text{expression 6}$$

subject to var(NPV) $\leqq$h, h being a risk value
precedence constraints
production rate constraints where h>0 is some value greater than the minimal risk.

Equivalently, (and conveniently for integer programs), variance of NPV could be relatively minimised subject to an upper bound on the expected NPV. In order to relatively simplify computation of this program, expression 6 can be represented as expression 7, namely:

The quadratic mixed integer program:

$$\min \text{var(NPV)} \qquad \text{expresson 7}$$

subject to Return(NPV) $\geqq$c
precedence constraints
production rate constraints where c>0 is some value less than or equal to the relatively maximal expected NPV. Also, production rate constraints can be made non-random as before, by using averages, such as average ore contents.

Figure 12:
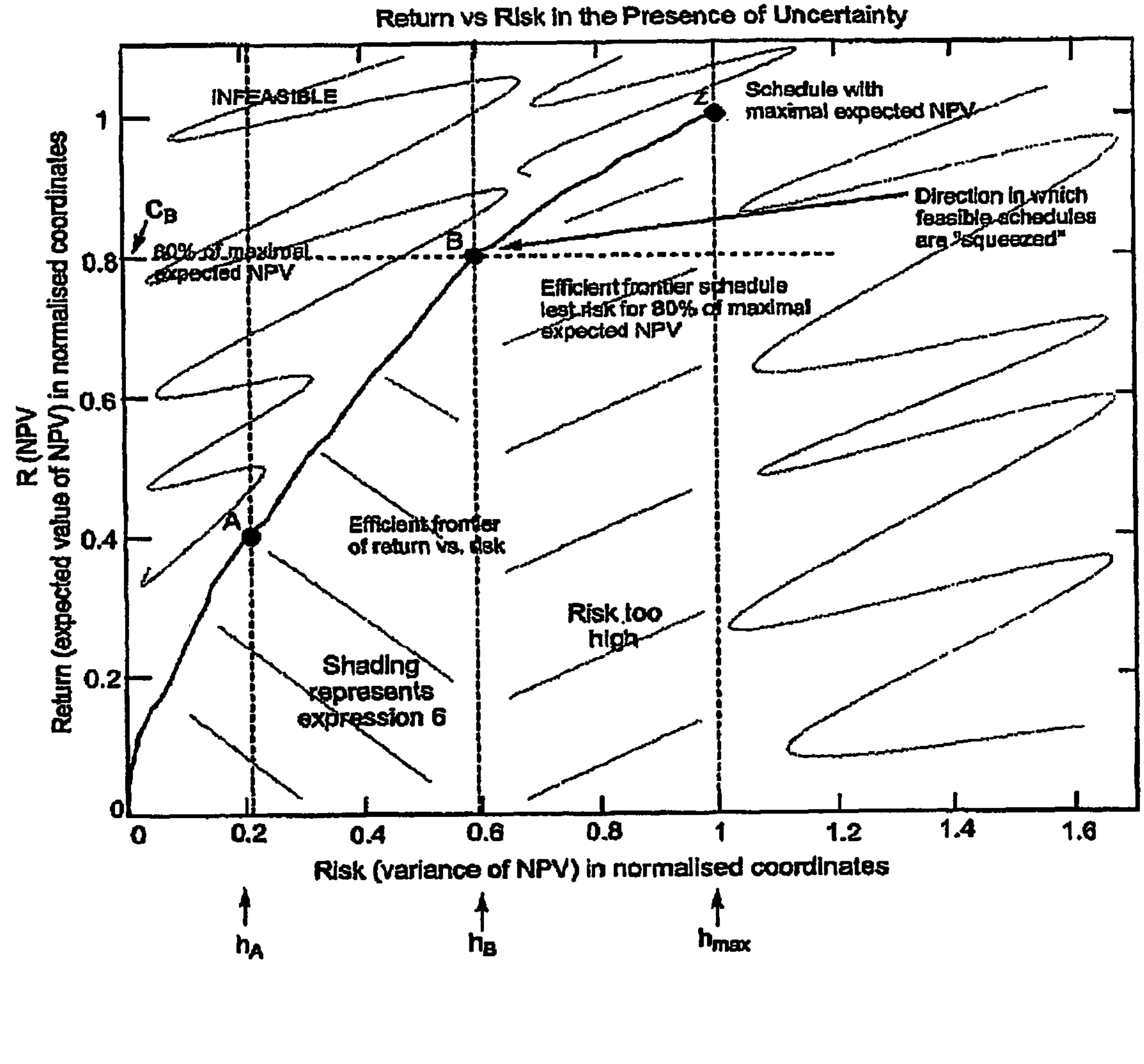
FIG. 12 illustrates diagrammatically a representation of the present invention and based on a plurality of drill holes and/or survey data.

Turning to FIG. 12, a mine designer can select the desired risk/return, and then iterate the above expressions to determine the appropriate schedule. In essence, each 'dot' or point on the curve represents or can be used to establish a different 'schedule'. The risk/return and its corresponding NPV can be used to establish a schedule for the removal of blocks. In FIG. 12, vertical lines constraining risk relate to expression 6 above, and horizontal lines constraining return relate to expression 7 above. For example, if a risk is selected to be $h_A$, then the expressions above can be solved resulting in point A on the curve of FIG. 12. This point A gives a first schedule with a corresponding risk, and return. Likewise, if a higher risk is selected to be $h_B$, then the expressions above can be solved resulting in point B on the curve of FIG. 12. This point B gives a second schedule with a corresponding risk and return.

In this manner, by use of the present invention, a relatively low risk/low return or relatively high risk/high return, and/or a relatively moderate risk/return can be selected as desired by the user. Each risk/return corresponds to a point on the curve, exemplified in FIG. 12, which in turn represents a corresponding schedule. FIG. 12 also illustrates areas considered too high is risk and areas which are considered practically infeasible. This differs from case to case. From this point, a schedule can be established using known techniques and/or techniques disclosed in corresponding patent application(s) filed by the present applicant on 9 Oct. 2002, namely Australian provisional application numbers 2002951892, 2002951957, 2002951894, 2002951891, 2002951893, 2002951898, 2002951898 and 2002951895, on 14 Nov. 2002 Australian provisional application numbers 2002952681 and 2002952654 and on 5 Mar. 2003 Australian provisional application number 2003901021, and herein incorporated by reference.

Generic KlumpKing

Figure 13:
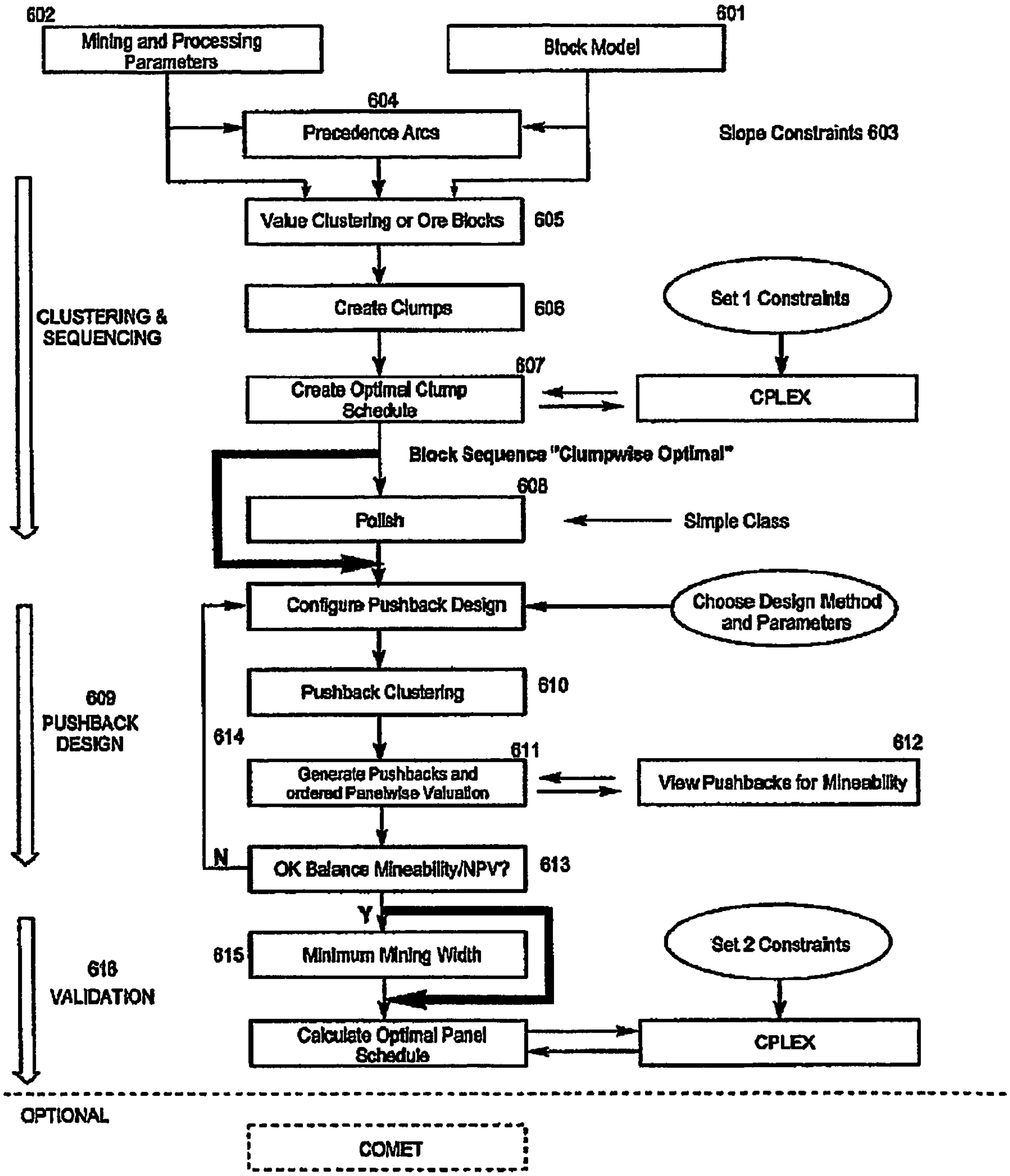
FIG. 13 illustrates, schematically, a flow chart outlining the overall process according to one aspect of invention.

FIG. 13 illustrates, schematically an overall representation of one aspect of invention.

Although specific aspects of various elements of the overall flow chart are discussed below in more detail, it may be helpful to provide an outline of the flow chart illustrated in FIG. 13.

Block model 601, mining and processing parameters 602 and slope constraints 603 are provided as input parameters. When combined, precedence arcs 604 are provided. For a given block, arcs will point to other blocks that must be removed before the given block can be removed.

As typically, the number of blocks can be very large, at 605, blocks are aggregated into larger collections, and clustered. Cones are propagated from respective clusters and dumps are then created 606 at intersections of cones. The number of dumps is now much smaller than the number of blocks, and clumps include slope constraints. At 607, the clumps may then be scheduled in a manner according to specified criteria, for example, mining and processing constraints and NPV. It is of great advantage that the scheduling occurs with clumps (which number much less than blocks). It is, in part, the reduced number of clumps that provides a relative degree of arithmetic simplicity and/or reduced requirements of the programming engine or algorithms used to determine the schedule. Following this, a schedule of individual block order can be determined from the clump schedule, by de-aggregating. The step of polish at 608 is optional but does improve the value of the block sequence.

From the block ordering, pushbacks can be designed 609. Secondary clustering can be undertaken 610, with an additional fourth co-ordinate. The fourth co-ordinate may be time, for example, but may also be any other desirable value or parameter. From here, cones are again propagated from the clusters, but in a sequence commensurate with the fourth co-ordinate. Any blocks already assigned to previously propagated cones are not included in the next cone propagation. Pushbacks are formed 611 from these propagated cones. Pushbacks may be viewed for mineability 612. An assessment as to a balance between mineability and NPV can be made at 613, whether in accordance with a predetermined parameter or not. The pushback design can be repeated if necessary via path 614.

Other consideration can also be taken into account, such as minimum mining width 615, and validation 616. Balances can be taken into account for mining constraints, downstream processing constraints and/or stockpiling options, such as blending and supply chain determination and/or evaluation.

The following description focuses on a number of aspects of invention which reside within the overall flow chart disclosed above. For the purposes of FIG. 13, sections 2 and 5 are associated with 605, sections 3, 4 and 5 are associated with 606, sections 4, 6 are associated with 607, sections 7 and 7.3 are associated with 610, sections 7.2 and 7.3 are associated with 611, section 7.3 is associated with 612, 613 and 614, and sections 7, 7.1, 7.2 and 7.3 are associated with 609.

Inputs and Preliminaries

Input parameters include the block model 601, mining and processing parameters 602, and slope constraints 603. Slope regions (eg. physical areas or zones) are contained in 601; slope parameters (eg. slopes and bearings for each zone) are contained in 602.

The block model 601 contains information, for example, such as the value of a block in dollars, the grade of the block in grams per tonne, the tonnage of rock in the block, and the tonnage of ore in the block.

The mining and processing parameters 602 are expressed in terms of tonnes per year that may be mined or processed subject to capacity constraints.

The slope constraints 603 contain information about the maximal slope around in given directions about a particular block.

The slope constraints 603 and the block model 601 when combined give rise to precedence arcs 604. For a given block, arcs will point from the given block to all other blocks that must be removed before the given block. The number of arcs is reduced by storing them in an inductive, where, for example, in two dimensions, an inverted cone of blocks may be described by every block pointing to the three blocks centred immediately above it. This principle can also be applied to three dimensions. If the inverted cone is large, for example having a depth of 10, the number of arcs required would be 100; one for each block. However, using the inductive rule of “point to the three blocks centred directly above you”, the entire inverted cone may be described by only three arcs instead of the 100, in this way the number of arcs required to be stored is greatly reduced. As block models typically contain hundreds of thousands of blocks, with each block containing hundreds of arcs, this data compression is considered a significant advantage.

Producing an Optimal Block Ordering

The number of blocks in the block model 601 is typically far too large to schedule individually, therefore it is desirable to aggregate the blocks into larger collections, and then to schedule these larger collections. To proceed with this aggregation, the ore blocks are clustered 605 (these are typically located towards the bottom of the pit. In one preferred form, those blocks with negative value, which are taken to be waste, are not clustered). The ore blocks are clustered spatially (using their x, y, z coordinates) and in terms of their grade or value. A balance is struck between having spatially compact clusters, and clusters with similar grade or value within them. These clusters will form the kernels of the atoms of aggregation.

From each cluster, an (imaginary) inverted cone is formed, by propagating upwards using the precedence arcs. This inverted cone represents the minimal amount of material that must be excavated before the entire cluster can be extracted. Ideally, for every duster, there is an inverted cone. Typically, these cones will intersect. Each of these intersections (including the trivial intersections of a cone intersecting only itself) will form an atom of aggregation, which is call a clump. Clumps are created, represented by 606.

The number of clumps produced is now far smaller than the original number of blocks. Precedence arcs between clumps are induced by the precedence arcs between the individual blocks. An extraction ordering of the clumps that is feasible according to these precedence arcs will automatically respect minimum slope constraints. It is feasible to schedule these clumps to find a substantially NPV maximal, clump schedule 607 that satisfies all of the mining and processing constraints.

Now that there is a schedule of clumps 607, this can be turned into a schedule of individual blocks. One method is to consider all of those clumps that are begun in a calendar year one, and to excavate these block by block starting from the uppermost level, proceeding level by level to the lowermost level. Other methods are disclosed in this specification. Having produced this block ordering, the next step may be to optionally Polish 608 the block ordering to further improve the NPV.

in a more complex case, the step of polish 608, can be bypassed. If it is desirable, however, polishing can be performed to improve the value of the block sequence.

Balanced NPV Optimal/Mineable Pushback Design from Block Ordering

From this block ordering, we can produce pushbacks, via pushback design 609. Advantageously, the present invention enables the creation of pushbacks that allow for NPV optimal mining schedules. A pushback is a large section of a pit in which trucks and shovels will be concentrated to dig, sometimes for a period of time, such as for one or more years. The block ordering gives us a guide as to where one should begin and end mining. In essence, the block ordering is an optimal way to dig up the pit. However, often this block ordering is not feasible because the ordering suggested is too spatially fragmented. In an aspect of invention, the block ordering is aggregated so that large, connected portions of the pits are obtained (pushbacks). Then a secondary clustering of the ore blocks can be undertaken 610. This time, the clustering is spatal (x, y, z) and ha& an additional 4th coordinate, which represents the block extraction time ordering. The emphasis of the 4th coordinate of time may be increased and decreased. Decreasing the emphasis produces clusters that are spatially compact, but ignore the optimal extraction sequence. Increasing the emphasis of the $4^{th}$ coordinate produces clusters that are more spatially fragmented but follow the optimal extraction sequence more closely.

Once the clusters have been selected (and ordered in time), inverted cones are propagated upwards in time order. That is, the earliest cluster (in time) is propagated upwards to form an inverted cone. Next, the second earliest duster is propagated upwards. Any blocks that are already assigned to the first cone are not included in the second cone and any subsequent cones. Likewise, any blocks assigned to the second cone are not included in any subsequent cones. These propagated cones or parts of cones form the pushbacks 611. This secondary clustering, propagation, and NPV valuation is relatively rapid, and the intention is that the user would select an emphasis for the 4th coordinate of time, perform the propagation and valuation, and view the pushbacks for mineability 612. A balance between mineability and NPV can be accessed 613, and if necessary the pushback design steps can be repeated, path 614. For example, if mineablilty is too fragmented, the emphasis of the 4th coordinate would be reduced. If the NPV from the valuation is too low, the emphasis of the 4th coordinate would be increased.

Once a pushback design has been selected, a minimum mining width routine 615 is run on the pushback design to ensure that a minimum mining width is maintained between the pushbacks and themselves, and the pushbacks and the boundary of the pit. An example in the open literature is "The effect of minimum mining width on NPV" by Christopher Wharton & Jeff Whittle. "Optimizing with Whittle" Conference, Perth, 1997.

Further Valuation

A more sophisticated valuation method 616 is possible at this final stage that balances mining and processing constraints, and additionally could take into account stockpiling options, such as blending and supply chain determination and/or evaluation.

Initial Identification of Clusters

It has been found that the number of blocks in a block model is typically far too large to schedule individually, therefore in accordance with one related aspect of invention, the blocks are aggregated into larger collections. These larger collections are then preferably scheduled. Scheduling means assigning a clump to be excavated in a particular period or periods.

Figure 14:
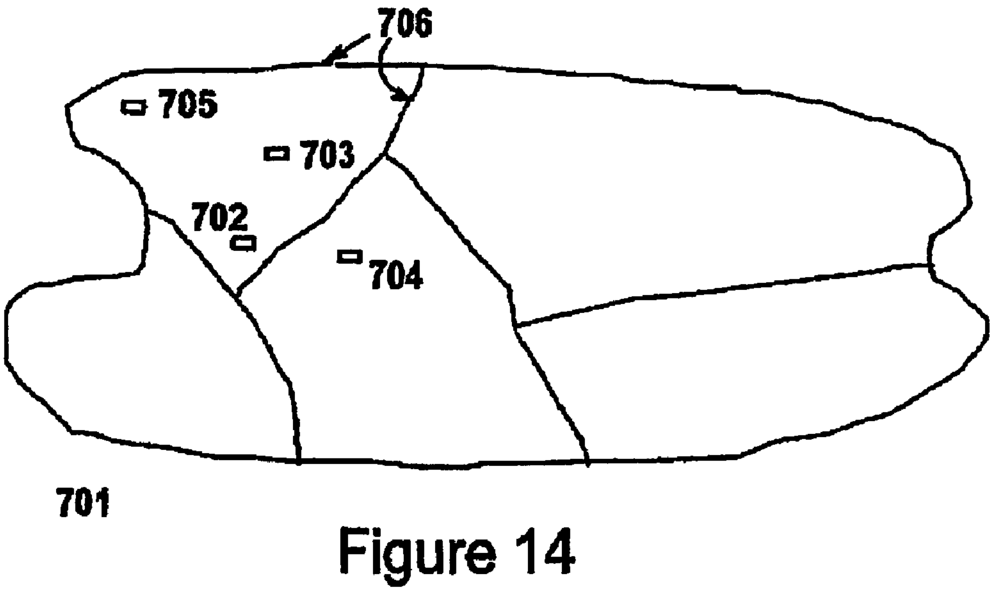
FIG. 14 illustrates schematically the identification of clusters.

To proceed with the aggregation, a number of ore blocks are clustered. Ore blocks are identified as different from waste material. The waste material is to be removed to reach the ore blocks. The ore blocks may contain substantially only ore of a desirably quality or quantity and/or be combined with other material or even waste material. The ore blocks are typically located towards the bottom of the pit, but may be located any where in the pit in accordance with a preferred aspect of the present invention, the ore blocks which are considered to be waste are given a negative value, and the ore blocks are not clustered with a negative value. It is considered that those blocks with a positive value, present themselves as possible targets for the staging of the open pit mine. This approach is built around targeting those blocks of value, namely those blocks with positive value. Waste blocks with a negative value are not considered targets and are therefore this aspect of invention does not cluster those targets. The ore blocks are clustered spatially (using their x, y, z coordinates) and in terms of their grade or value. Preferably, limits or predetermined criteria are used in deciding the clusters. For example, what is the spatial limit to be applied to a given cluster of blocks? Are blocks spaced 10 meters or 100 meters apart considered one cluster? These criteria may be varied depending on the particular mine, design and environment. For example, FIG. 14 Illustrates schematically an ore body 701. Within the ore body are a number of blocks 702, 703, 704 and 705. (The ore body has many blocks, but the description will only refer to a limited number for simplicity) Each block 702, 703, 704 and 705 has its own individual x, y, z coordinates. If an aggregation is to be formed, the coordinates of blocks 702, 703, 704 and 705 can be analysed according to a predetermined criteria. If the criteria is only distance, for example, then blocks 702, 703 and 704 are situated closer than block 705. The aggregation may be thus formed by blocks 702, 703 and 704. However, if, in accordance with this aspect of invention, another criteria is also used, such as grade or value, blocks 702, 703 and 705 may be considered an aggregation as defined by line 706, even though block 704 is situated closer to blocks 702 and 703. A balance is struck between having spatially compact clusters, and clusters with similar grade or value within them. These clusters will form the kernels of the atoms of aggregation. It is important that there is control over spatial compactness versus the grade/value similarity. If the clusters are too spatially separated, the inverted cone that we will ultimately propagate up from the duster (as will be described below) will be too wide and contain superfluous stripping. If the clusters internally contain too much grade or value variation, there will be dilution of value. It is preferable for the clusters to substantially sharply identify regions of high grade and low-grade separately, while maintaining a spatial compactness of the clusters. Such clusters have been found to produce high-quality aggregations.

Furthermore, where a relatively large body of ore is encountered, the ore body may be divided into a relatively large number of blocks. Each block may have substantially the same or a different ore grade or value. A relatively large number of blocks will have spatial difference, which may be used to define aggregates and dumps in accordance with the disclosure above. The ore body, in this manner may be broken up into separate regions, from which individual cones can be defined and propagated.

Propagation of clusters and formation of clumps in accordance with the present invention, from each duster, an inverted cone (imaginary) is formed. A cone is referred to as a manner of explaining visually to the reader what occurs. Although the collection of blocks forming the cone does look like a discretised cone to the human eye. In a practical embodiment, this step would be simulated mathematically by computer. Each cone is preferably a minimal cone, that is, not over sized. This cone is represented schematically or mathematically, but for the purposes of explanation it is helpful to think of an inverted cone propagating upward of the aggregation. The inverted cone can be propagated upwards of the atom of aggregation using the precedence arcs. Most mine optimisation software packages use the idea of precedence arcs. The cone is preferably three dimensional. The inverted cone represents the minimal amount of material that must be excavated before the entire cluster can be extracted. In accordance with a preferred form of this aspect of invention, every cluster has a corresponding inverted cone.

Typically, these cones will intersect another cone propagating upwardly from an adjacent aggregation. Each intersection (including the trivial intersections of a cone intersecting only itself) will form an atom of aggregation, which is call a 'clump', in accordance with this aspect. Precedence arcs between clumps are induced by the precedence arcs between the individual blocks. These precedence arcs are important for identifying which extraction ordering of dumps are physically feasible and which are not. Extraction orderings must be consistent with the precedence arcs. This means that if block/clump A points to block/clump B, then block/clump B must be excavated earlier than block/clump A.

Figure 15:
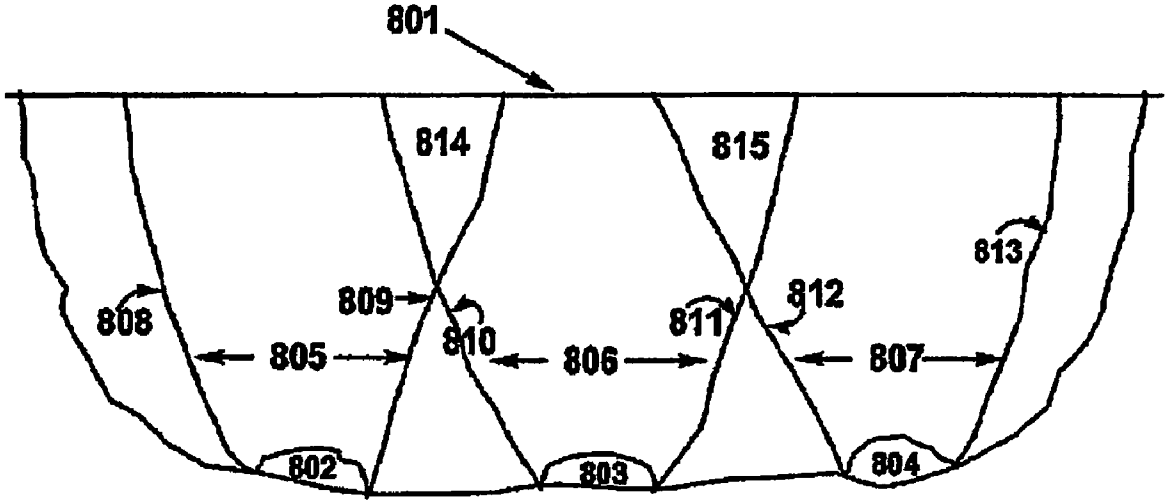
FIG. 15 illustrates schematically cone propagation in pit design.

With reference to FIG. 15, illustrating a pit 801, in which there are ore bodies 802, 803, and 804. Having identified the important "ore targets" in the stage of initial identification of clusters, as described above, the procedure of propagation and formation of clumps goes on to produce mini pits (clumps) that are the most efficient ways access these "ore targets". The clumps are the regions formed by an intersection of the cones, as well as the remainder of cones once the intersected areas are removed. In accordance with the embodiment aspect, intersected areas must be removed before any others. Eg. 814 must be dug up before either 805 or 806, in FIG. 15. In accordance with the description above, cones 805, 806 and 807 are propagated (for the purposes of illustration) from ore bodies to be extracted The cones are formed by precedence arcs 808, 809, 810, 811, 812 and 813. In FIG. 15, for example, clumps are designated regions 814 and 815. Other clumps are also designated by what is left of the inverted cones 805, 806 and 807 when 814 and 815 have been removed. The clump area is the area within the cone. The overlaps, which are the intersections of the cones, are used to allow the excavation of the inverted cones in any particular order. The collection of clumps has three important properties. Firstly, the clumps allow access to the all targets as quickly as possible (minimality), and secondly the dumps allow many possible orders of access to the identified ore targets (flexibility). Thirdly, because cones are used, an extraction ordering of the clumps that is feasible according to the precedence arcs will automatically respect and accommodate minimum slope constraints. Thus, the slope constraints are automatically built into this aspect of invention.

Spitting of Waste and Ore in Clumps

Figure 16:
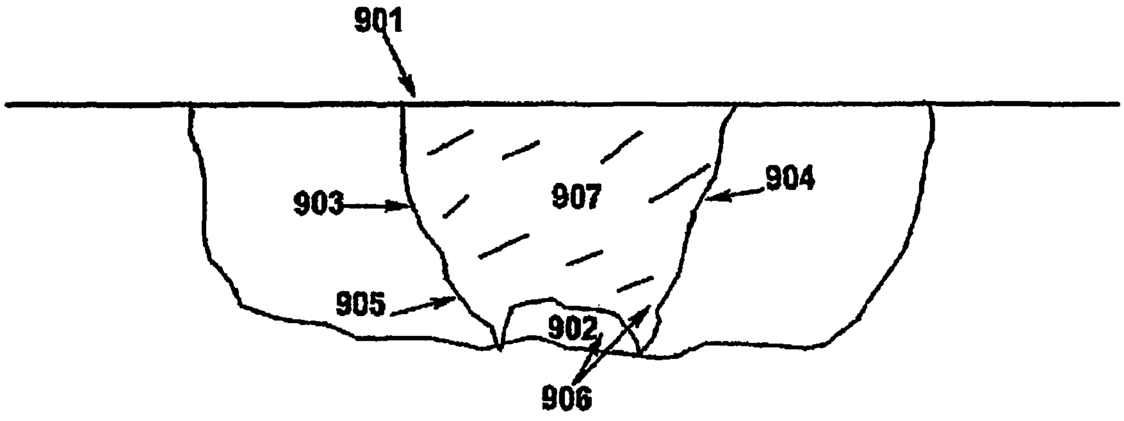
FIG. 16 illustrates schematically the splitting or ore from waste material.

Once the initial clumps have been formed, a search is performed from the lowest level of the clump upwards. The highest level at which ore is contained in the clump is identified; everything above this level is considered to be waste. The option is given to split the clump into two pieces; the upper piece contains waste, and the lower piece contains a mixture of waste and ore. FIG. 16 illustrates a pit 901, in which there is an ore body 902. From the ore body, precedence arcs 903 and 904 define a cone propagating upward. In accordance with this aspect of invention, line 905 is identified as the highest level of the clump 902. Then 906 can designate ore, and 907 can designate waste. This splitting of waste from ore designations is considered to allow for a more accurate valuation of the clump. Many techniques assume that the value within a clump is uniformly distributed, however, in practice this is often not the case. By splitting the clump into two pieces, one with substantially pure waste and the other with mostly ore, the assumption of homogeneity is more likely to be accurate. More sophisticated splitting based on finer divisions of value or grade are also possible in accordance with predetermined criteria, which can be set from time to time or in accordance with a particular pit design or location. Equally, other characteristics, either instead of or in addition to value and grade may be used to distinguish regions of material with or at a particular location. Such characteristics may be chosen, selected or altered from time to time, and in accordance with the requirements or needs of the particular mine, location and/or iteration being undertaken.

Aggregation of Blocks Into Clumps: High-Level Ideas

In accordance with this aspect, the feature of 'clumping blocks together' may be viewed for the purpose of arithmetic simplicity where the number of blocks are too large. The number of clumps produced is far smaller than the original number of blocks. This allows a mixed integer optimisation engine to be used, otherwise the use of mixed integer engines would be considered not feasible. For example, Cplex by ILOG may be used. This aspect has beneficial application to the invention disclosed in pending provisional patent application no. 2002951892, tiled "Mining Process and Design" filed 10 Oct. 2002 by the present applicant, and which is herein incorporated by reference. This aspect can be used to reduce problem and calculation size for other methods (such as disclosed in the co-pending application above).

The number of clumps produced is far smaller than the original number of blocks. This allows a mixed integer optimisation engine to be used. The advantage of such an engine is that a truly optimal (in terms of maximizing NPV) schedule of clumps may be found in a (considered) feasible time. Moreover this optimal schedule satisfies mining and processing constraints. Allowing for mining and processing constraints, the ability to find truly optimal solutions represents a significant advance over currently available commercial software. The quality of the solution will depend on the quality of the clumps that are input to the optimisation engine. The selection procedures to identify high quality clumps have been outlined in the sections above.

Some commercial software, as noted in the background section of this specification, do use mixed integer programming engines, however, the method of aggregating blocks is different either in method, or in application, and we believe of lower-quality. For example, it is considered that 'ECSI Maximiser' uses a form of integer optimisation in their pushback design, and restricts the time window for each block, but the optimisation is local in time, and it's problem formulation is considered too large to optimise globally over the life of a mine. In contrast, in accordance with the present invention, a global optimisation over the entire life of mine is performed by allowing dumps to be taken at any time from start of mine life to end of mine life. 'MineMax' may be used to find rudimentary optimal block sequencing with a mixed integer programming engine, however it is considered that it's method of aggregation does not respect slopes as is required In many situations. 'MineMax' also optimises locally in time, and not globally. In use, there is a large number of variables, and the user must therefore resort to subdividing the pit to perform separate optimisations, and thus the optimisation is not global over the entire pit. The present invention is global in both space and time.

Determination of a Block Ordering from a Clump Ordering

Now that there is a schedule of clumps, it is desirable to turn this into a schedule of individual blocks. One method is to consider all of those clumps that are begun in year one, and to excavate these block by block starting from the uppermost level, proceeding level by level to the lowermost level. One then moves on to year two, and considers all of those clumps that are begun in year two, excavating all of the blocks contained in those clumps level by level from the top level through to the bottom level. And so on, until the end of the mine life.

Typically, some clumps may be extracted over a period of several years. This method just described is not as accurate as may be required for some situations, because the block ordering assumes that the entire clump is removed without stopping, once it is begun. Another method is to consider the fraction of the clump that is taken in each year. This method begins with year one, and extracts the blocks in such a way that the correct fractions of each clump for year one are taken in approximately year one. The integer programming engine assigns a fraction of each dump to be excavated in each period/year. This fraction may also be zero. This assignment of clumps to years or periods must be turned into a sequence of blocks. This may be done as follows. If half of the clump A is taken in year one, and one third of clump B is taken in year one, and all other fractions of dumps in year one are zero, the blocks representing the upper half of clump A and the blocks representing the upper one-third of dump B are joined together. This union of blocks is then ordered from the uppermost bench to the lowermost bench and forms the beginning of the blocks sequence (because we are dealing with year one). One then moves on to year two and repeats the procedure, concatenating the blocks with those already in the sequence.

Having produced this block ordering, block ordering may be in a position to be optionally Polished to further improve the NPV. The step of Polishing is similar to the method disclosed in co-pending application 2002951892 (described above, and incorporated herein by reference) but the starting condition is different. Rather than best value to lowest value, as is disclosed in the co-pending application, in the present aspect, the start is with the block sequence obtained from the clump schedule.

Second Identification of Clusters for Pushback Design

Fuzzy Clustering; Alternative 1 (Space/Time Clustering of Block Sequence)

From this block ordering, we must produce pushbacks. This is the ultimate goal of KlumpKing—to produce pushbacks that allow for NPV optimal mining schedules. A pushback is a large section of a pit in which trucks and shovels will be concentrated for one or more years to dig. The block ordering gives us a guide as to where one should begin and end mining. In principle, the block ordering is the optimal way to dig up the pit. However, it is not feasible, because the ordering is too spatially fragmented. It is desirable to aggregate the block ordering so that large, connected portions of the pits are obtained (pushbacks). A secondary clustering of the ore blocks is undertaken. This time, clustering is spatially (x, y, z) and as a 4th coordinate, which is used for the block extraction time or ordering. The emphasis of the 4th coordinate of time may be increased or decreased. Decreasing the emphasis produces clusters that are spatially compact, but tend to ignore the optimal extraction sequence. Increasing the emphasis produces clusters that are more spatially fragmented but follow the optimal extraction sequence more closely.

Once the clusters have been selected, they may be ordered in time. The clusters are selected based on a known algorithm of fuzzy clustering, such as J C Bezdek, R H Hathaway, M J Sabin, W T Tucker. "Convergence Theory for Fuzzy c-means: Counterexamples and Repairs". IEEE Trans. Systems, Man, and Cybernetics 17 (1987) pp 873-877. Fuzzy clustering is a clustering routine that tries to minimise distances of data points from a cluster centre. In this inventive aspect, the cluster uses a four-dimensional space; (x, y, z, v), where x, y and z give spatial coordinates or references, and 'v' is a variable for any one or a combination of time, value, grade, are type, time or a period of time, or any other desirable factor or attribute. Other factors to control are cluster size (an terms of ore mass, rock mass, rock volume, $value, average grade, homogeneity of gradetvalue), and cluster shape (in terms of irregularity of boundary, sphericalness, and connectivity). In one specific embodiment, v represents ore type. In another embodiment, dusters may be ordered in time by accounting for 'v' as representing dusters according to their time centres.

There is also the alternative embodiment of controlling the sizes of the clusters and therefore the sizes of the pushbacks. "Size" may mean rock tonnage, ore tonnage, total value, among other things. In this aspect, there is provided a fuzzy clustering algorithm or method, which in operation serves to, where if a pushback is to begin, its corresponding cluster may be reduced in size by reassigning blocks according to their probability of belonging to other clusters.

There is also another embodiment, where there is an algorithm or method that is a form of 'crisp', as opposed to fuzzy, clustering, specially tailored for the particular type of size control and time ordering that are found in mining applications: This 'crisp' clustering is based on a method of slowly growing clusters while continually shuffling the blocks between clusters to improve cluster quality.

Fuzzy Clustering; Alternative 2 (Propagation of Clusters)

Having disclosed clustering, above, another related aspect of invention is to then propagate these clusters in a time ordered way without using intersections, to produce the pushbacks.

Figure 17:
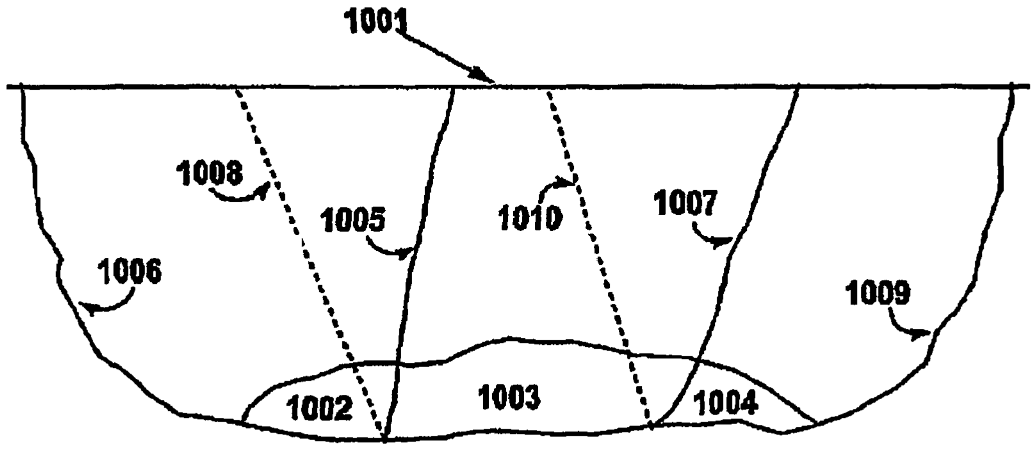
FIG. 17 illustrates an example of 'fuzzy clustering' in a mine site.

Referring to FIG. 17, a mine site 1001 is schematically represented, in which there is an ore body of 3 sections, 1002, 1003, and 1004.

Inverted cones are then propagated upwards in a time order, as represented in FIG. 17, by lines 1005 and 1006 for cone 1.

That is, the earliest cluster (in time) is propagated upwards to form an inverted cone. Next, the second earliest cluster is propagated upwards, as represented in FIG. 10 by lines 1007 and 1008 (dotted) for cone 2, and lines 1009 and 1010 (dotted) for cone 3. Any blocks that are already assigned to the first cone are not included in the second cone. This is represented in FIG. 17 by the area between lines 1008 and 1005. This area remains a part of cone 1 according to this inventive aspect Again, in FIG. 17, the area between lines 1010 and 1007 remains a part of cone 2, and not any subsequent cone. This method is applied to any subsequent cones. Likewise, any blocks assigned to the second cone are not included in any subsequent cones. These propagated cones or parts of cones form the pushbacks.

Fuzzy Clustering; Alternative 3 (Feedback Loop of Pushback Design)

In this related aspect, there is a process loop of clustering, propagating to find pushbacks, valuing relatively qulcidy, and then feeding this information back into the choice of clustering parameters.

This secondary clustering, propagation, and NPV valuation is relatively vapid, and the intention is that there would be an iterative evaluation of the result, either by computer or user, and accordingly the emphasis for the 4th coordinate can be selected, the propagation and valuation can be considered and performed, and the pushbacks for mineability can also be considered and reviewed. If the result is considered too fragmented, the emphasis of the 4th coordinate may be reduced. If the NPV from the valuation is too low, the emphasis of the 4th coordinate may be increased.

Figure 18A:
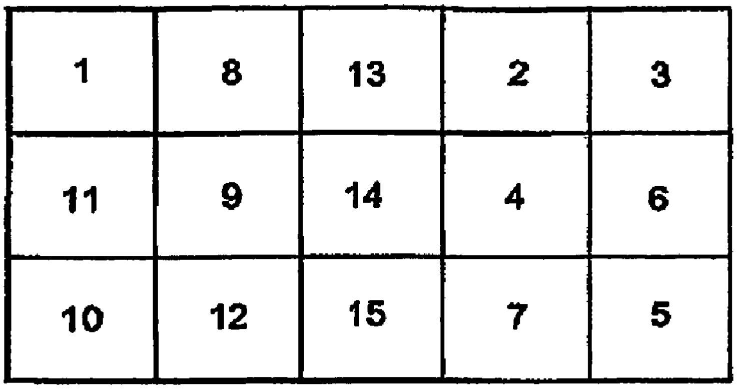
FIGS. 18*a*, 18*b* and 18*c* illustrate a secondary clustering, propagation, and NPV valuation process.

Referring to FIG. 18*a*, there is illustrated in plan view a two dimensional slice of a mine site. In the example there are 15 blocks, but the number of blocks may be any number. In this example, blocks have been numbered to correspond with extraction time, where 1 is earliest extraction, and 15 is latest extraction time. In the example illustrated, the numbers indicate relatively optimal extraction ordering.

Figure 18B:
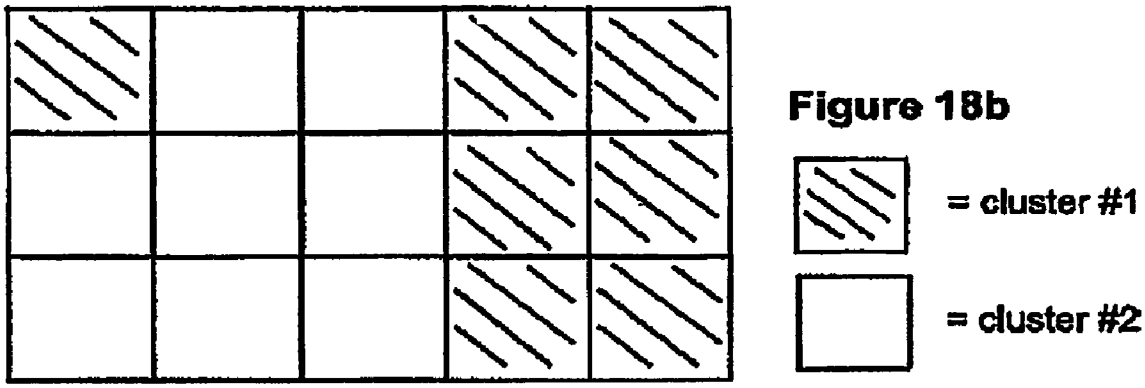
Figure 18C:
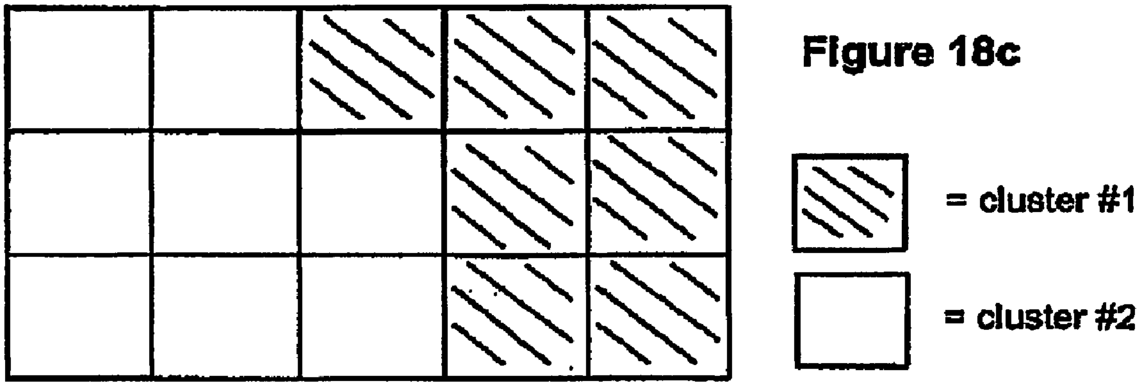

In accordance with the aspect disclosed above, FIG. 18*b* illustrates an example of the result of clustering where there is a relatively high fudge factor and relatively high emphasis on time. Cluster number 1 is seen to be fragmented, has a relatively high NPV but is not considered mineable.

in accordance with the aspect disclosed above, FIG. 18*c* illustrates an example of the result of clustering where there is a lower emphasis on time, as compared to FIG. 18*b*. The result illustrated is that both clusters number one and two are connected, and 'rounded', and although they have a slightly lower NPV, the clusters are considered mineable.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

The present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

What is claimed is:

1. A method of transforming a representation of a mine having at least one pit, the method comprising:

obtaining a block model of the pit in which material is divided into a plurality of blocks, the block model representing the mine;

processing the blocks of the block model with a processor to define a plurality of clusters each comprising a plurality of blocks;

forming, with the processor, a cone for each cluster propagating upwardly by precedence arcs extending from each cluster; and defining, with the processor, clumps of material from the intersection of the cones, the clumps comprising volumes of material not crossed by precedence arcs;

generating, with the processor, an initial block sequence from the defined clumps, the block sequence representing a potential order of extraction of blocks from the mine;

determining, with the processor, a value for time of extraction for each of the blocks of the block model from the block sequence; and reprocessing the blocks of the block model with the processor based on the determined time values to define a plurality of revised clusters and processing the revised clusters with the processor to define a plurality of clumps representing the mine.

2. The method according to claim 1 wherein processing the blocks of the block model to form clusters is performed based on spatial position of blocks relative to one another.

3. The method of claim 1, further comprising processing the blocks of the block model with the processor to form clusters based on at least one further criteria comprising a variable selected from the group comprising value of material, grade of material, and material type.

4. The method according to claim 1 comprising controlling the effect of the determined time values with the processor so that clusters are formed from blocks which are more spatially fragmented but more closely follow an optimal extraction schedule in the representation of the mine.

5. The method according to claim 1 comprising controlling the effect of the determined time values so the clusters are formed from blocks which are spatially compact but ignore an optimal extraction sequence in the representation of the mine.

6. The method according to claim 1 wherein when a plurality of clusters has been defined, the clusters are ordered in time by the processor and the plurality of cones are propagated upwardly from each cluster in order of time by the processor, and wherein any blocks already assigned to a first cone are not included in a second cone or any subsequent cone, and any blocks assigned to the second cone are not included in any subsequent cone and so-on.

7. The method according to claim 1, comprising determining a revised block sequence with the processor to thereby further represent the mine.

8. A method of extracting material from a mine comprising transforming a representation of a mine as claimed in claim 1, and extracting material from the mine based on the transformed representation.

9. The apparatus according to claim 1, wherein the processor is arranged to determine a revised block sequence to thereby further represent the mine.

10. An apparatus for transforming a representation of a mine having at least one pit comprising:

a processor for receiving a block model of the pit in which material is divided into a plurality of blocks, the block model representing the mine;

the processor also being for:

processing the blocks of the block model to define a plurality of clusters each comprising a plurality of blocks;

forming a cone for each cluster propagating upwardly by precedence arcs extending from each cluster; and defining clumps of material from the intersection of the cones, the clumps comprising volumes of material not crossed by precedence arcs;

generating an initial block sequence from the defined clumps, the block sequence representing a potential order of extraction of blocks from the mine;

determining a value for time of extraction for each of the blocks of the block model from the block sequence; and reprocessing the blocks of the block model based on the determined time value to define a plurality of revised clusters and processing the revised clusters to define a plurality of clumps representing the mine.

11. The apparatus according to claim 10, wherein the processor is arranged to process the blocks of the block model to form clusters based on spatial position of blocks relative to one another.

12. The apparatus of claim 10, wherein the processor is arranged to process the blocks of the block model to form clusters based on at least one further criteria comprising a variable selected from the group comprising value of material, grade of material, and material type.

13. The apparatus according to claim 10 wherein the processor is arranged to control the effect of the determined time values so that clusters are formed from blocks which are more spatially fragmented but more closely follow an optimal extraction schedule in the representation of the mine.

14. The apparatus according to claim 10 wherein the processor is arranged to control the effect of the determined time values so the clusters are formed from blocks which are spatially compact but ignore an optimal extraction sequence in the representation of the mine.

15. The apparatus according to claim 10 wherein when a plurality of clusters has been defined, the clusters are ordered in time by the processor and the plurality of cones are propagated upwardly from each cluster in order of time by the processor, and wherein any blocks already assigned to a first cone are not included in a second cone or any subsequent cone, and any blocks assigned to the second cone are not included in any subsequent cone and so-on.

* * * * *